(12) United States Patent
Semenic et al.

(10) Patent No.: US 12,329,306 B2
(45) Date of Patent: Jun. 17, 2025

(54) COOKWARE AND A METHOD OF MANUFACTURE THEREOF

(71) Applicant: Teledyne Scientific & Imaging, LLC, Thousand Oaks, CA (US)

(72) Inventors: Tadej Semenic, Thousand Oaks, CA (US); Seongchul Jun, Newbury Park, CA (US); Avijit Bhunia, Newbury Park, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 805 days.

(21) Appl. No.: 17/430,773

(22) PCT Filed: Mar. 27, 2019

(86) PCT No.: PCT/US2019/024263
§ 371 (c)(1),
(2) Date: Aug. 13, 2021

(87) PCT Pub. No.: WO2020/171832
PCT Pub. Date: Aug. 27, 2020

(65) Prior Publication Data
US 2022/0160161 A1 May 26, 2022

Related U.S. Application Data

(60) Provisional application No. 62/807,150, filed on Feb. 18, 2019.

(51) Int. Cl.
*A47J 27/024* (2006.01)
*A47J 27/00* (2006.01)
*F28D 15/02* (2006.01)

(52) U.S. Cl.
CPC ........... *A47J 27/024* (2013.01); *A47J 27/002* (2013.01); *F28D 15/0275* (2013.01); *F28D 15/0283* (2013.01)

(58) Field of Classification Search
CPC .................................................... A47J 27/024
See application file for complete search history.

(56) References Cited

U.S. PATENT DOCUMENTS

| | | | |
|---|---|---|---|
| 2,955,184 A | 10/1960 | Grindrod | |
| 3,460,971 A | 8/1969 | Bonis et al. | |

(Continued)

FOREIGN PATENT DOCUMENTS

| | | |
|---|---|---|
| CA | 1060741 | 8/1979 |
| CN | 2037587 | 5/1989 |

(Continued)

OTHER PUBLICATIONS

International Search Report and Written Opinion of the International Searching Authority for PCT/US2019/024263 mailed May 24, 2019.

(Continued)

*Primary Examiner* — John J Norton
(74) *Attorney, Agent, or Firm* — K&L Gates LLP

(57) ABSTRACT

Cookware and a method of manufacture thereof are provided. The method comprises forming a fluid conduit defining a volume in a base of the cookware, the base comprising a heating zone configured for thermal communication with the fluid conduit. A working fluid is introduced to the fluid conduit via an open end of the fluid conduit. A liquid phase of the working fluid occupies less than the volume of the fluid conduit. The fluid conduit is Sized and configured to form vapor segments and liquid segments interspersed (Continued)

throughout the fluid conduit from the working fluid. The open end of the fluid conduit is sealed to define a closed fluid system.

16 Claims, 16 Drawing Sheets

(56) References Cited

U.S. PATENT DOCUMENTS

| | | | |
|---|---|---|---|
| 3,561,525 A | 2/1971 | Baer | |
| 3,563,309 A | 2/1971 | Basiulis | |
| 3,677,337 A | 7/1972 | Midolo | |
| 3,682,239 A | 8/1972 | Abu-Romia | |
| 3,741,289 A | 6/1973 | Moore | |
| 3,779,310 A | 12/1973 | Russell | |
| 3,786,861 A | 1/1974 | Eggers | |
| 3,791,372 A | 2/1974 | Hatsopoulos et al. | |
| 3,815,575 A | 6/1974 | Danis | |
| 3,990,502 A | 11/1976 | Best | |
| 4,043,387 A | 8/1977 | Lamp | |
| 4,296,728 A | 10/1981 | Hifstetter | |
| 4,300,624 A | 11/1981 | Minning et al. | |
| 4,331,200 A | 5/1982 | Basiulis et al. | |
| 4,365,664 A | 12/1982 | Basiulis | |
| 4,470,451 A | 9/1984 | Alario et al. | |
| 4,854,379 A | 8/1989 | Shaubach et al. | |
| 4,862,708 A | 9/1989 | Basiulis | |
| 4,921,041 A | 5/1990 | Akachi | |
| 4,955,361 A | 9/1990 | Sotani et al. | |
| 5,247,874 A | 9/1993 | George, II et al. | |
| 5,358,799 A | 10/1994 | Gardner | |
| 5,685,289 A | 11/1997 | Yogev | |
| 5,697,428 A | 12/1997 | Akachi | |
| 5,716,657 A | 2/1998 | Liebermann | |
| 6,446,706 B1 | 9/2002 | Rosenfeld et al. | |
| 6,474,100 B1 | 11/2002 | Smith et al. | |
| 7,137,442 B2 | 11/2006 | Kawahara et al. | |
| 7,265,979 B2 | 9/2007 | Erturk et al. | |
| 7,345,877 B2 | 3/2008 | Asfia et al. | |
| 2007/0261244 A1* | 11/2007 | Cheng | F28D 15/0275 29/890.032 |
| 2008/0283221 A1 | 11/2008 | Terp et al. | |
| 2009/0020269 A1 | 1/2009 | Chang et al. | |
| 2009/0101308 A1 | 4/2009 | Hardesty | |
| 2011/0146956 A1 | 6/2011 | Stroock | |
| 2012/0241122 A1 | 9/2012 | Xiang et al. | |
| 2013/0312939 A1 | 11/2013 | Uchida et al. | |
| 2014/0197355 A1 | 7/2014 | Ram et al. | |
| 2015/0090725 A1* | 4/2015 | Cheng | A47J 27/002 220/573.1 |
| 2017/0208984 A1 | 7/2017 | Cai et al. | |
| 2017/0234624 A1 | 8/2017 | Cai et al. | |
| 2018/0106553 A1* | 4/2018 | Bozorgi | F28D 15/0283 |

FOREIGN PATENT DOCUMENTS

| | | | |
|---|---|---|---|
| CN | 1483988 A | 3/2004 | |
| CN | 101072530 A | 11/2007 | |
| CN | 204862612 U | 12/2015 | |
| DE | 3027006 A1 | 2/1982 | |
| EP | 0224038 A1 | 3/1987 | |
| GB | 2127143 | 4/1984 | |
| JP | 58-86028 U | 6/1983 | |
| JP | H04-135240 U | 12/1992 | |
| JP | H8-1715 Y | 1/1996 | |
| JP | H10-38483 A | 2/1998 | |
| JP | 2002-130967 A | 5/2002 | |
| KR | 20110089010 A * | 8/2011 | F28D 15/02 |
| KR | 20110128380 A * | 11/2011 | A47J 27/022 |
| WO | WO 0054638 A1 | 9/2000 | |
| WO | WO 0126517 A1 | 4/2001 | |

OTHER PUBLICATIONS

Faghri, Amir, "Heat Pipes: Review, Opportunities and Challenges", Frontiers in Heat Pipes, www.HeatPipeCentral.org, vol. 5, No. 1, 2014, 48 pages.

International Preliminary Report on Patentability for International Application No. PCT/US2017/012941 issued Jul. 24, 2018.

International Search Report and Written Opinion for International Application No. PCT/US2017/012941 issued Mar. 29, 2017.

Membranes, University of Mississippi, Nov. 7, 2014, 3 pages.

Schniewind, Thermal Degradation, Concise Encyclopedia of Wood and Wood-Based Materials, 1st edition, Elmsford, NY, Pergamon Press, 1989, pp. 271-273.

Doshi et al., "Osmotic Heat Pipe: Problems and Promises", Letters in Heat and Mass Transfer, Pergamon Press, Great Britain, vol. 4, 1977, pp. 429-436.

Ippohshi et al., "Study of Heat Transport of an Osmotic Heat Pipe: Part 1, Effects of the Initial Concentration on Heat Transport Limits", Heat Transfer—Asian Research, 29, (1), 2000, pp. 59-71.

Ippohshi et al., "Study of Heat Transport of an Osmotic Heat Pipe: Part 2, Flow in the Membrane Module", Heat Transfer—Asian Research 29 (4), 2000, pp. 317-332.

Ippohshi et al., "Fundamental Study on an Osmotic Heat Pipe with a Two-Phase Solution Loop", Heat Pipe Science and Technology, Proceedings of the 11th Int. Heat Pipe Conference, Tokyo, Japan, 1999, pp. 414-419.

Kazadi et al., "A Membrane-Enabled Solar Heat Pipe for Solar Thermal Water Heating", The 2nd International Symposium on Environment Friendly Energies and Applications, IEEE, 2012, pp. 173-178.

Adelberg, M., Effective Thermal Conductivity and Multilayered Insulation, Advances in Cryogenic Engineering, K. D. Timmerhaus (ed.) Springer Science +Business Media, New York, 1967, p. 252.

* cited by examiner

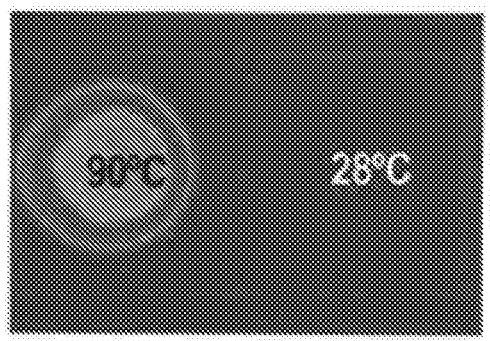
FIG. 14A
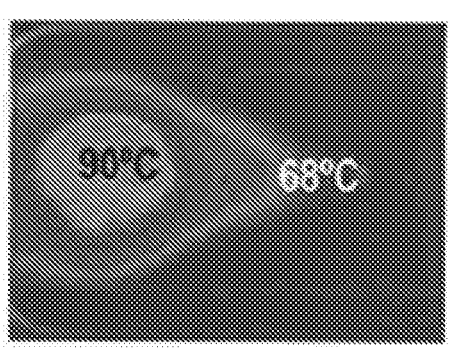
FIG. 14B
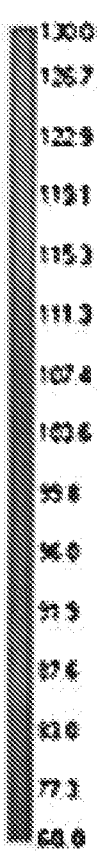
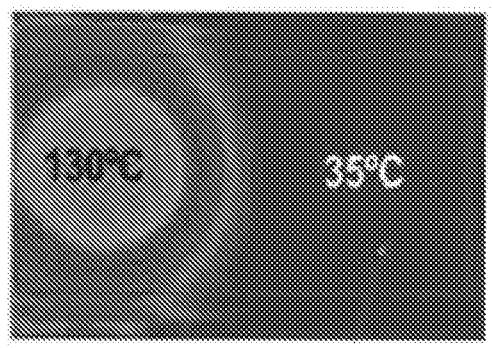
FIG. 14C
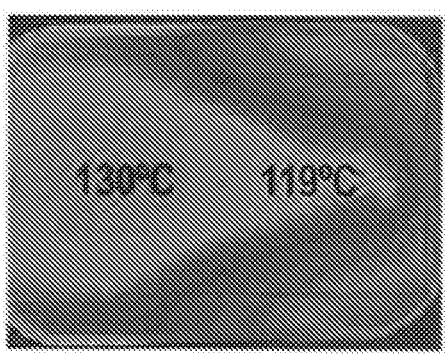
FIG. 14D

_US 12,329,306 B2_

COOKWARE AND A METHOD OF MANUFACTURE THEREOF

CROSS-REFERENCE TO RELATED APPLICATIONS

This application is a national stage application claiming priority to International Application No. PCT/US2019/024263, which was filed on Mar. 27, 2019, which claims priority to U.S. Provisional Patent Application No. 62/807,150, which was filed on Feb. 18, 2019, each of which are hereby incorporated by reference.

TECHNICAL FIELD

The present disclosure relates to cookware and a method of manufacture thereof.

BACKGROUND

The information described in this background section is not admitted to be prior art.

Cookware can be used to heat objects, such as, for example, food. Improper heating of food by the cookware can cause undesired results during a cooking process. There are challenges with manufacturing cookware that can heat objects as desired.

SUMMARY

In one example, a method for manufacturing a cookware is provided. The method comprises forming a fluid conduit defining a volume in a base of the cookware, the base comprising a heating zone configured for thermal communication with the fluid conduit. A working fluid is introduced to the fluid conduit via an open end of the fluid conduit. A liquid phase of the working fluid occupies less than the volume of the fluid conduit. The fluid conduit is sized and configured to form vapor segments and liquid segments interspersed throughout the fluid conduit from the working fluid. The open end of the fluid conduit is sealed to define a closed fluid system.

In another example, a method for manufacturing a cookware is provided. The method comprises forming a fluid conduit defining a volume in a base of the cookware. The base comprises a heating zone configured for thermal communication therewith. Forming the fluid conduit comprises forming a channel in the base of the cookware. The channel defines a cavity having a first diameter and sidewalls defining an opening having a second diameter that is less than the first diameter. A tube is pressed into the channel of the base of the cookware. The fluid cavity is disposed within the tube. The tube is deformed to a shape substantially similar to a shape of the channel. The tube comprises an open end. A working fluid is introduced to the fluid conduit via an open end of the fluid conduit. A liquid phase of the working fluid occupies less than the volume of the fluid conduit. The fluid conduit is sized and configured to form vapor segments and liquid segments interspersed throughout the fluid conduit from the working fluid. The open end of the fluid conduit is sealed to define a closed fluid system utilizing at least one of crimping the open end of the tube and welding the open end of the tube.

In another example, a cookware is provided. The cookware comprises a base and a fluid conduit. The base comprises a first side, a second side, and a heating zone on the first side. The base comprises a metal or a metal alloy. The fluid conduit defines a volume embedded in the base. The heating zone is configured for thermal communication with the fluid conduit. The fluid conduit comprises a sealed end, a curved section, and a working fluid. A liquid phase of the working fluid occupies less than the volume of the fluid conduit. The fluid conduit is sized and configured to form vapor segments and liquid segments interspersed throughout the fluid conduit from the working fluid.

It is understood that the contents of this specification is not limited to the examples summarized in this Summary. The reader will appreciate the foregoing details, as well as others, upon considering the following detailed description of various non-limiting and non-exhaustive examples according to this specification.

DRAWINGS

The features and advantages of the examples, and the manner of attaining them, will become more apparent, and the examples will be better understood, by reference to the following description taken in conjunction with the accompanying drawings, wherein:

FIG. 14A is a thermal image of the second comparative griddle after heating at 150 Watts of heat output;

FIG. 14B is a thermal image of the inventive griddle according to the present disclosure after heating at 150 Watts of heat output;

FIG. 14C is a thermal image of the second comparative griddle treating at 230 Watts of heat output; and FIG. 14D is a thermal image of the inventive griddle according to the present disclosure after heating at 230 Watts of heat output.

Figure 1A:
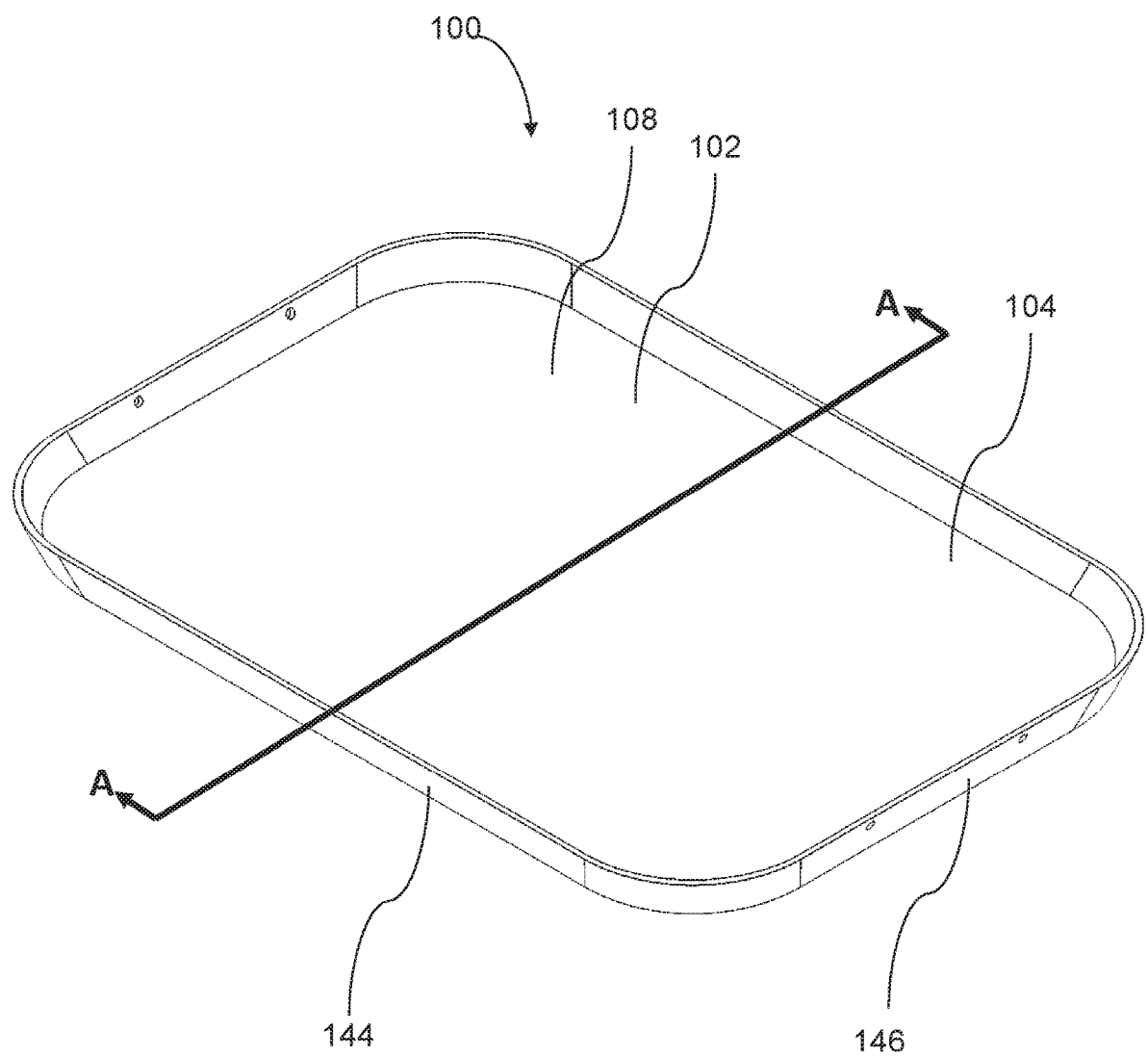
FIG. 1A is a front perspective view of a cookware according to an aspect of the present disclosure.

Corresponding reference characters indicate corresponding parts throughout the several views. The exemplifications set out herein illustrate certain embodiments, in one form, and such exemplifications are not to be construed as limiting the scope of the appended claims in any manner.

DESCRIPTION

Various examples are described and illustrated herein to provide an overall understanding of the structure, function, and use of the disclosed articles and methods. The various examples described and illustrated herein are non-limiting and non-exhaustive. Thus, various aspects of this disclosure are not limited, by the description of the various non-limiting and non-exhaustive examples disclosed herein. Rather, the various aspects of this disclosure are defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various example," "some examples," "one example," "an example," or like phrases mean that a particular feature, structure, or characteristic described in connection with the example is included in one example or two or more examples. Thus, appearances of the phrases "in various examples," "in some examples," "in one examples," "in an examples," or like phrases in the specification do not necessarily refer to the same examples. Furthermore, the particular described features, structures, or characteristics may be combined in any suitable manner in one example or two or more examples. Thus, the particular features, structures, or characteristics illustrated or described in connection with one example may be combined, in whole or in part, with the features, structures, or characteristics of other examples without limitation. Such modifications and variations are intended to be included within the scope of the present examples.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

A cookware that comprises a heating zone that can be rapidly and/or uniformly heated can improve the results of a cooking process and/or increase an energy efficiency of the cooking process. For example, rapidly heating a heating zone that may contain a portion which is not in direct contact with a heat source may be difficult and/or result in non-uniform heating. Thus; a cookware and a method of manufacture thereof are provided herein which can rapidly and/or uniformly transfer heat to a heating zone.

Referring to FIGS. 1A-F, a cookware 100 is provided. The cookware 100 can comprise a base 102, a fluid conduit 110, a channel 118, and a tube 120. The base 102 can comprise a first side 104, a second side 106, a third side 144, a fourth side 146, and a heating zone 10S on the first side 104. The first side 104 can be substantially parallel to the second side 106. The third side 144 can be longer than the fourth side 146 or the third side 144 can be substantially the same length as the fourth side 146. In various examples, the fourth side 146 can be longer than the third side 144. In various aspects, the base 102 defines a cooking surface.

The heating zone 108 can comprise at least a portion of or all of the first side 104 of the base 102. The heating zone 108 can be configured for thermal communication with the fluid conduit 110. As used herein, the phrase "configured for thermal communication" means an element has the ability to thermally communicate (e.g., transfer heat) with another element and does not necessarily mean that the elements are actively thermally communicating.

The heating zone 108 can receive thermal input (e.g., heat) from the fluid conduit 110 and/or second side 106 of the base. The heating zone 108 can directly contact an object to be heated, such as, for example, food, and directly transfer heat to the object to be heated. The heating zone 108 may not be in direct contact with the object to be heated and can be in contact with an additional layer which can be in direct contact with the object to be heated. The heating zone 108 can indirectly transfer heat to the object to be heated through the additional layer. The heating zone 108 can be a food-heating zone.

The base 102 can comprise a metal or a metal alloy. For example, a metal or metal alloy can comprise at least one of aluminum, an aluminum alloy, copper, a copper alloy (e.g., brass), nickel, a nickel alloy, iron, and an iron alloy. An iron alloy can comprise steel, such as, for example, stainless steel (e.g., 300 series, 400 series).

Figure 1B:
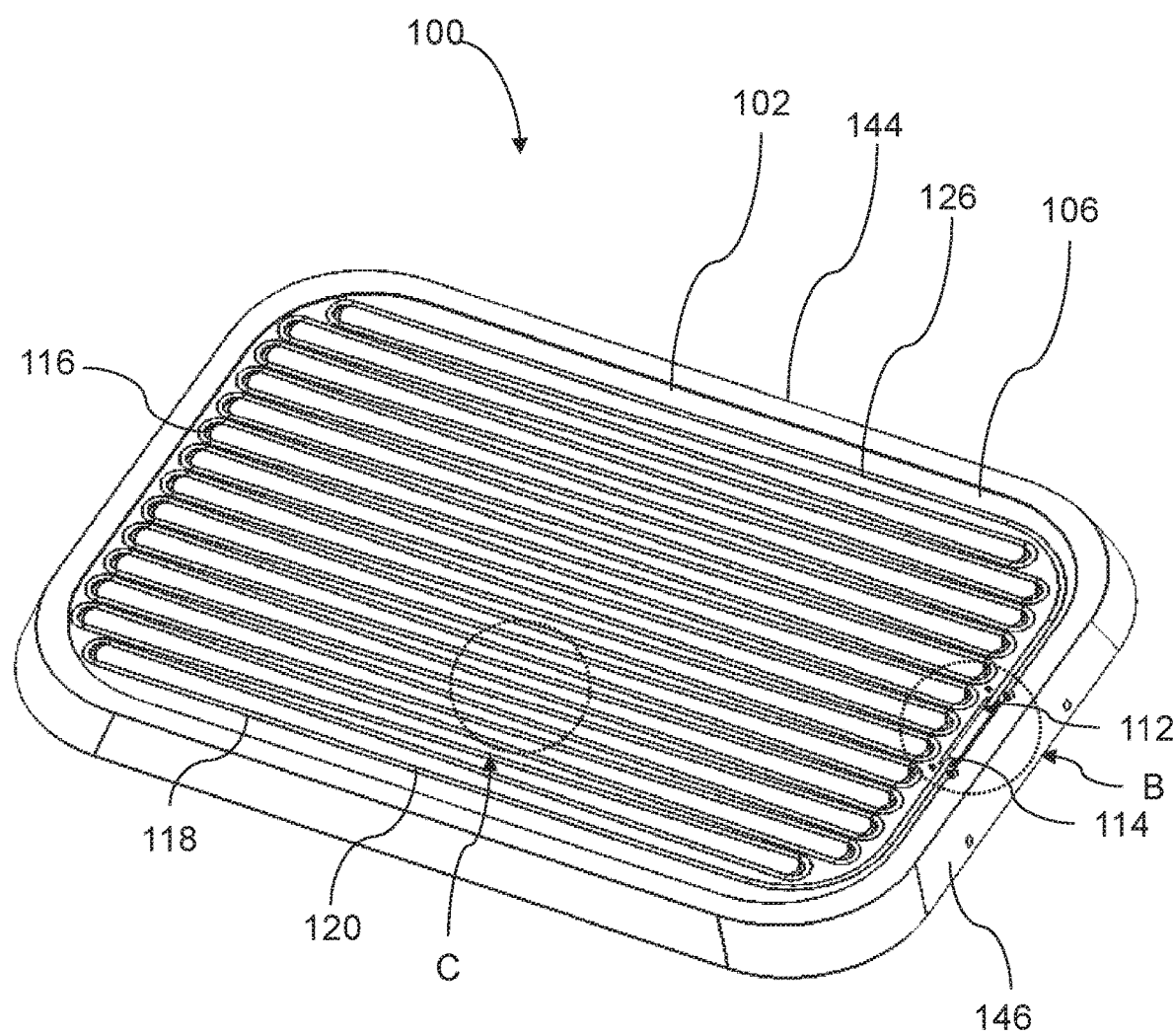
FIG. 1B is a back perspective view of the cookware of FIG. 1A.
Figure 1C:
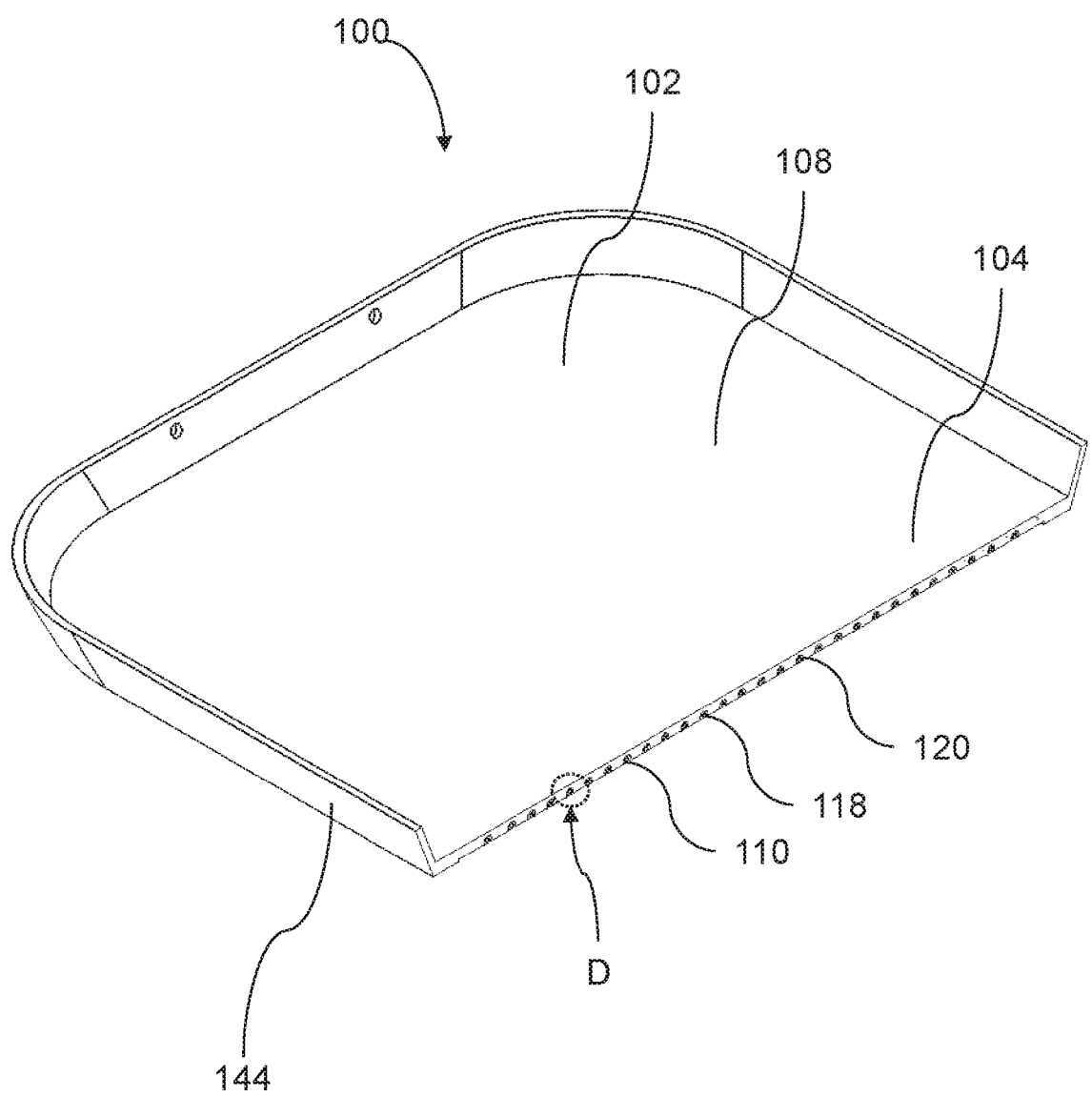
FIG. 1C is a cross-sectional view of the cookware of FIG. 1A cut along line A-A.
Figure 1D:
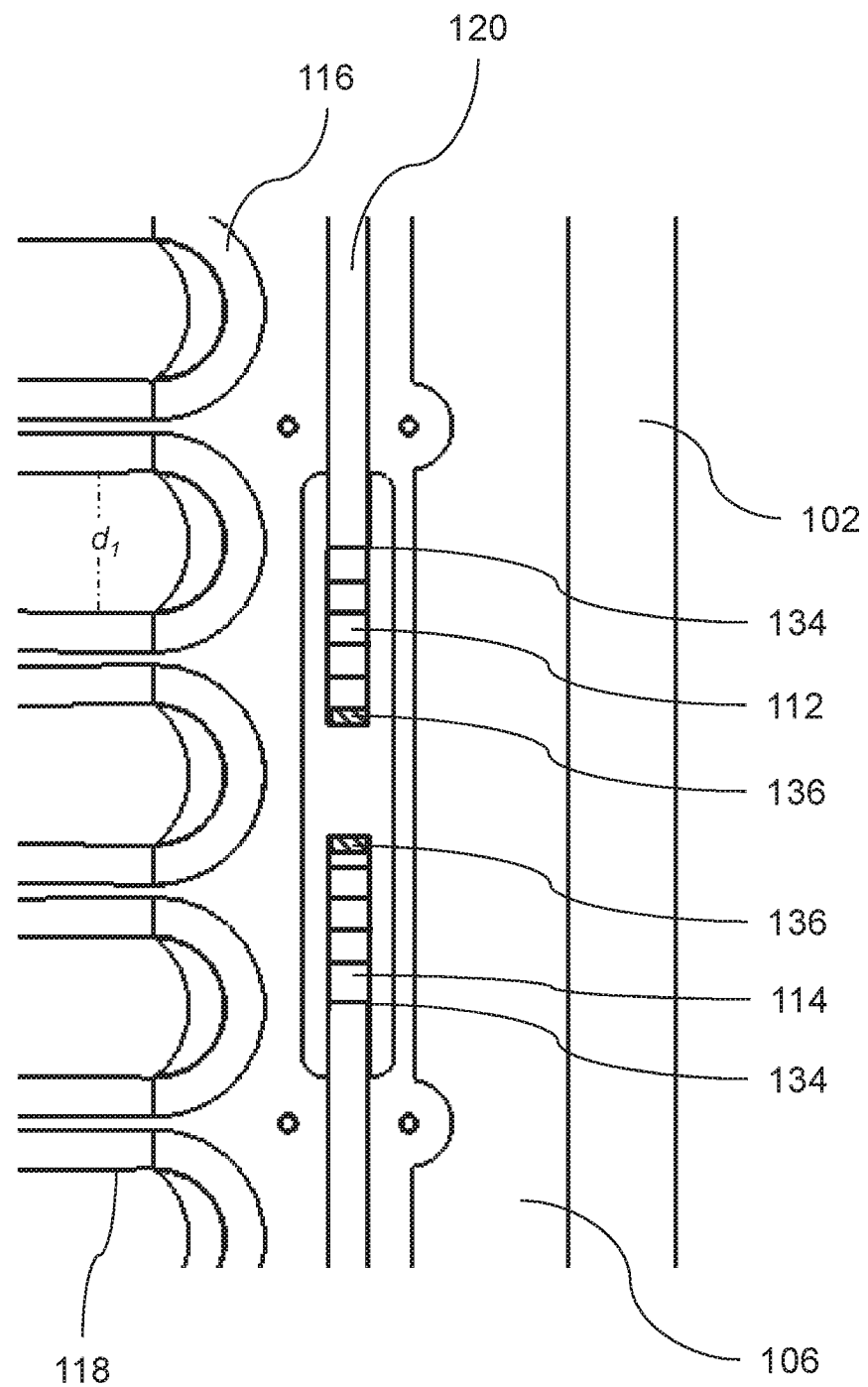
FIG. 1D is a detail view of area B of FIG. 1B.
Figure 1E:
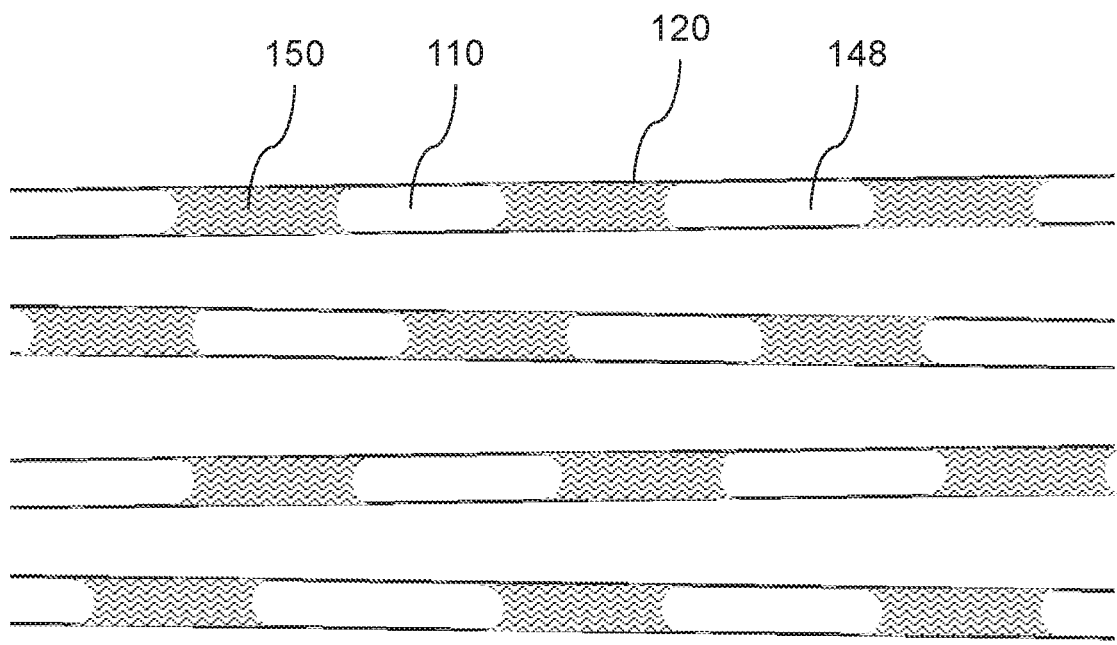
FIG. 1E is a detail view of area C of FIG. 1B with the top surface of the tube removed and a base of the cookware hidden.
Figure 1F:
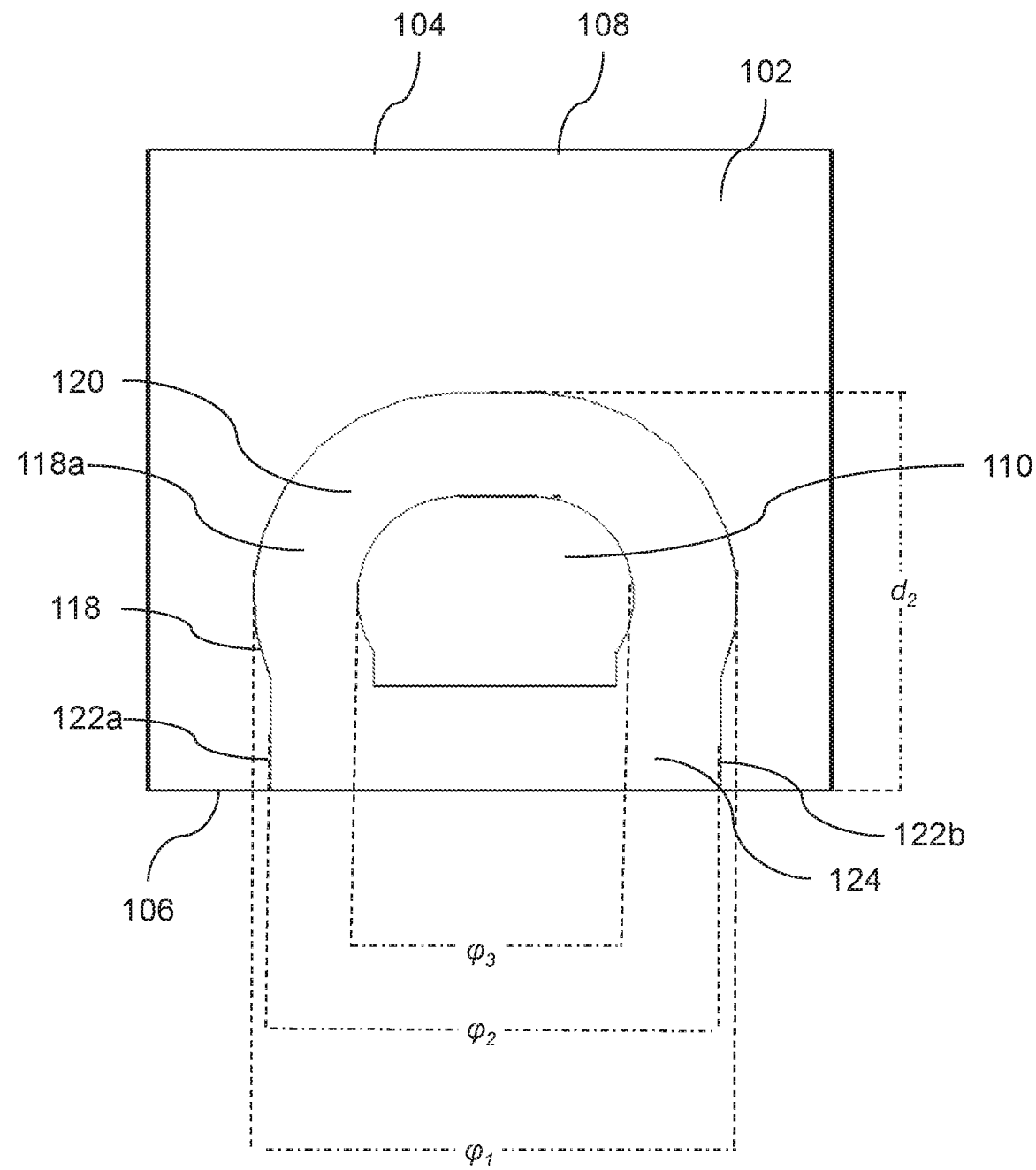
FIG. 1F is a detail view of area D of FIG. 1C.

As illustrated in FIG. 1B with a detail view illustrated in FIG. 1F, the channel 118 can be embedded in the base 102 of the cookware 100. The channel 118 may be embedded into the second side 106 of the base 102 and may not extend to the first side 104 of the base 102. The channel 118 can define a cavity 118a having a first diameter, $\varphi_1$, and sidewalls 122a-b defining an opening 124, e.g., a neck, having a second diameter, $\varphi_2$, that is less than the first diameter, $\varphi_1$. The channel 118 has a depth $d_2$. In one aspect, the first diameter, $\varphi_1$, of the cavity 118a can be in a range of 1.0 millimeter (mm) to 6.0 mm. In another aspect, the first diameter, of the cavity 118a can be in a range of 3.0 mm to 5.0 mm. In yet another aspect, the first diameter, $\varphi_1$, of the cavity 118a can be in a range of 3.6 mm to 4.0 mm and is nominally 3.8 mm. In one aspect, the second diameter, $\varphi_2$, of the opening 124 can be in a range of 1.0 mm to 6.0 mm. In another aspect, the second diameter, $\varphi_2$, of the opening 124 can be in a range of 3.0 mm to 5.0 mm. In yet another aspect, the second diameter, $\varphi_2$, of the opening 124 can be in a range of 3.1 mm to 3.5 mm and is nominally 3.3 mm.

The cavity 118a can comprise a substantially oval or circular cross-sectional shape and the opening 124 can comprise a substantially rectangular shape. The channel 118 can define a mushroom shape as shown in the cross-sectional detail view of FIG. 1F.

Figure 2:
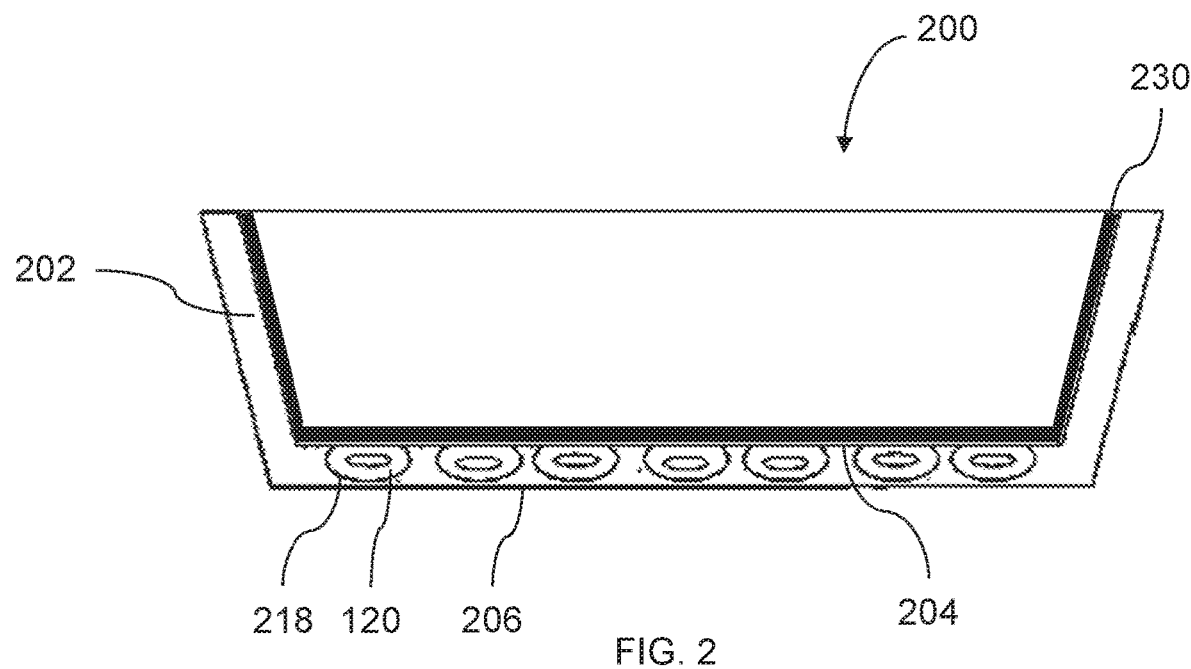
FIG. 2 is a cross-sectional view of a cookware comprising a channel embedded into a first side of the base according to an aspect of the present disclosure.
Figure 3:
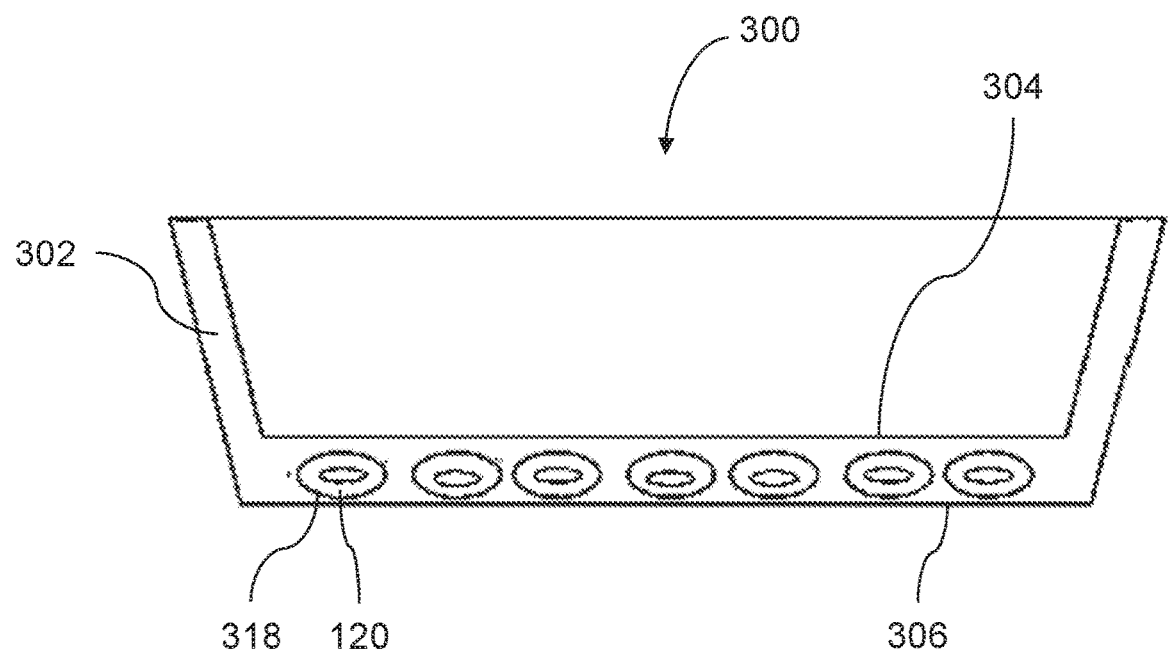
FIG. 3 is a cross-sectional view of a cookware comprising a channel embedded within a base according to an aspect of the present disclosure.

In various other examples, as illustrated in FIG. 2, a channel 218 can be embedded into a first side 204 of a base 206 of a cookware 200 and may not extend to a second side 206 of the base 202. As illustrated in FIG. 3, a channel 318 can be embedded within a base 302 of a cookware 300 and may not extend to the first side 304 or the second side 306 of the base 302.

Referring back to FIG. 1F, the tube 120 can be disposed within the channel 118 and the tube 120 can occupy at least a portion of or all of the cavity 118a and the opening 124 of the channel 118. The tube 120 can be retained by the sidewalls 122a-b. For example, the tube 120 can comprise a cross-sectional shape that can limit, if not prevent, removal of the tube 120 from the channel 118 due to contact between the tube 120 and the sidewalls 122a-b. The tube 120 can comprise a cross-sectional shape substantially similar to a shape of the channel 118 (e.g., a shape which can be nested within the channel 118). The tube 120 can define a mushroom shape. Thus, the tube 120 may not require additional adhering procedures, such as, for example, brazing in order to be retained within the channel 118 in the base 102. The tube 120 can comprise a metal or metal alloy. An inner diameter, $\varphi_3$, of the tube 120 can be in a range of 1.0 mm to 3.0 mm, such as, for example, 1 mm to 2 mm. In another aspect, the inner diameter, $\varphi_3$, of the tube 120 can be in a range of 1.8 mm to 2.2 mm and is nominally 2 mm. The tube 120 can have a wall thickness in a range of 0.1 mm to 2 mm, such as, for example, 0.5 mm to 1.5 mm. In another aspect, the tube 120 can have a wall thickness in a range of 0.8 mm to 1.2 mm and is nominally 1 mm. In yet another aspect, the tube 120 can have a wall thickness greater than 0.8 mm. For example, the tube 120 can comprise an outer diameter in a range of 3.0 mm to 3.4 mm and is nominally 3.2 mm. The tube 120 can comprise a metal or metal alloy which has a hardness less than the hardness of the metal or metal alloy of the base 102. In one aspect, the depth $d_2$ of the channel can be in a range of 1.0 mm to 5.0 mm. In another aspect, the depth $d_2$ of the channel can be in a range of 2.0 mm to 4.0 mm. In yet another aspect, the depth $d_2$ of the channel can be in a range of 2.8 mm to 3.2 mm and is nominally 3.0 mm.

The tube 120 can be configured to contact a desired amount of surface area of the base 102. For example, the tube 120 can comprise a curved section, such as, for example, a plurality of curved sections 116 and linear sections 126 which can span across the base 102. The curved sections 116 can connect two linear sections 126. The curved sections 116 can be configured in order to orient the linear sections 126. For example, the curved sections can have a bend angle in a range of 160 degrees to 200 degrees depending on the desired configuration of the tube 120. The bend angle can be selected based on a desired number of linear sections 126. The curved sections 116 can be within the channel 118. In various other examples, the curved sections 116 may not be within the channel 118 and can extend beyond the base 120 (not shown). The channel 118 can continuously contact the tube 120. In various examples, the channel 118 can comprise at least a portion which does not contact the tube.

The linear sections 126 can be configured in a direction similar to or substantially parallel to the third side 144 of the cookware. In various other examples, the linear sections 126 can be configured in a direction similar to or substantially parallel to the fourth side 146 of the cookware 100. The linear sections 126 can be separated by a distance, $d_1$, depending on the configuration of the curved sections 116. For example, the distance, $d_1$, between the linear sections 126 of the tube 118 can be in a range of 10 mm to 30 mm.

As shown in FIGS. 1B and 1D, the tube 120 can comprise ends 112, 114. Each end 112, 114 can be open to enable introduction of working fluid into the tube 120 and the fluid conduit 110. Each end 112, 114 can be sealed by at least one of a crimp 134 in the tube 120 and a weld 136 in the tube 120. As illustrated in FIG. 1D, the ends 112, 114 are each respectively sealed by five crimps 134 and one weld 136.

Figure 5:
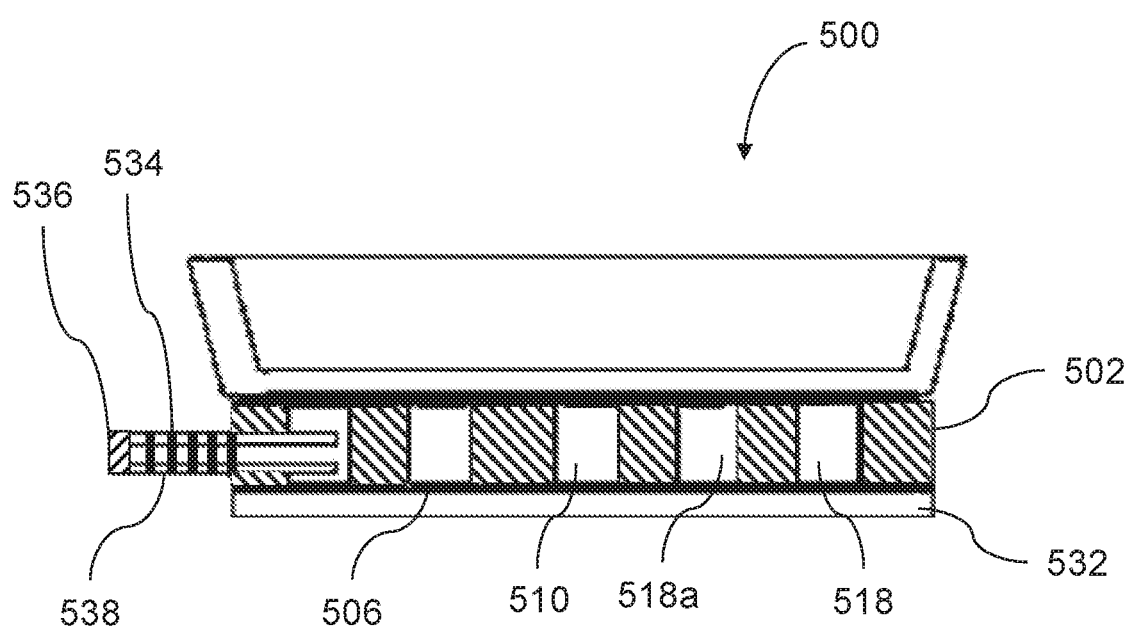
FIG. 5 is a cross-sectional view of a cookware comprising a fluid conduit in contact with a base of the cookware according to an aspect of the present disclosure.

Referring to FIGS. 1C, 1E, and 1F, the fluid conduit 110 can define a volume embedded in the base 102. The tube 120 can define the fluid cavity 110 as the fluid cavity 110 can be disposed within the tube 118. Thus, the fluid conduit 110 can comprise a first conduit end corresponding to the end 112 of the tube, a second conduit end corresponding to the end 114 of the tube 120, a curved conduit section, such as, for example, a plurality of curved conduit sections corresponding to curved sections 116 of the tube 120, and a linear conduit section, such as, for example, a plurality of linear conduit sections corresponding to linear sections 126 of the tube 120. In various examples, the fluid conduit 110 can comprise a single end (e.g., a sealed charging port 538) as illustrated in FIG. 5 herein or two sealed ends as illustrated in FIGS. 1B and 1D (e.g., corresponding to ends 112, 114 of tube 120). The fluid conduit 110 can comprise at least two sealed ends. The fluid conduit 110 can be wickless.

A working fluid can be disposed within the fluid conduit 110. The working fluid can comprise, for example, at least one of water, silicone oil, and a refrigerant. For example, the working fluid can be degassed water. Referring to FIG. 1E, the fluid conduit 110 can be sized and configured to form a vapor phase (e.g., vapor segments 148) and a liquid phase (e.g., liquid segments 150) interspersed throughout the fluid conduit 110 from the working fluid. For example, the fluid conduit 110 can be configured as an oscillating heat pipe. The size and configuration of the fluid conduit 110 can be selected based on the type and/or amount of working fluid. For example, the size and configuration of the fluid conduit 110 can be selected based on at least one of a surface tension of the working fluid, a density of the working fluid, and a contact angle formed between the fluid conduit and the working fluid.

The vapor segments 148 and liquid segments 150 can oscillate back and forth within the fluid conduit 110. For example, thermal input in a heated section of the fluid conduit 110 can change at least a portion of the liquid segments 150 exposed to the heated section into vapor and/or increase the temperature of the vapor segments 148 in the heated section which can increase the pressure within the vapor segments 148 in heated section. The increased pressure can cause the vapor segments 148 to move and/or move the liquid segments 150 through the fluid conduit 110 in an axial direction of the fluid conduit 110 to a cooler section of the fluid conduit 110. In the cooler section of the fluid conduit 110, the pressure in the vapor segments 148 can decrease due to a loss of heat and/or due to condensation of vapor. The cooled vapor segments 148 can then move hack to the heated section. The heating and cooling of the vapor segments 148 and liquid segments 150 can enable an oscillatory motion of vapor segments 148 and liquid segments 150 within the fluid conduit 110 which can transport heat from the heating section to the cooler section via the oscillation of the working fluid in the axial direction of the fluid conduit 110. In various examples, the cookware 100 can comprise an oscillation mini-channel as described in U.S. patent application Ser. No. 15/004,527 which is hereby incorporated by reference.

The liquid phase of the working fluid can occupy less than the volume of the fluid conduit 110. For example, the liquid phase of the working fluid can occupy a range of 20 percent to 80 percent of the volume of the fluid conduit 110, such as, for example, 40 percent to 60 percent of the volume of the fluid conduit 110. The vapor phase can occupy the balance of the volume of the fluid conduit 110 at one atmosphere of pressure and room temperature 25 degrees Celsius). For example, the liquid segments 150 can occupy a range of 20 percent to 80 percent of the volume of the fluid conduits 110 at one atmosphere of pressure and 0 degrees Celsius, such as, for example, 40 percent to 60 percent of the volume of the fluid conduit 110 at one atmosphere of pressure and room temperature (e.g., 25 degrees Celsius).

Figure 6:
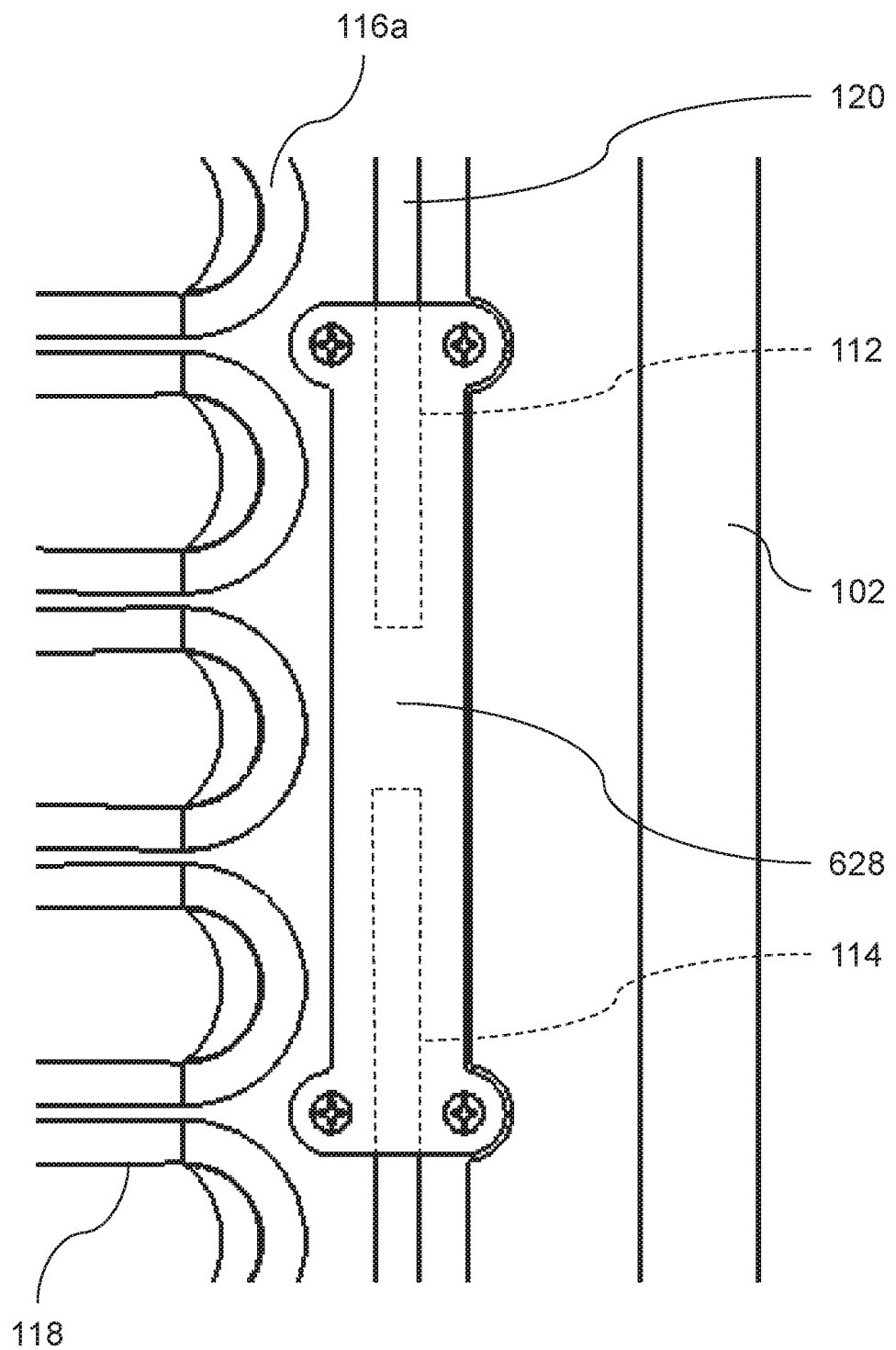
FIG. 6 is a detail view of a cookware comprising a cover according to an aspect of the present disclosure.

Referring to FIG. 6, the cookware 100 can comprise a cover 628 over the ends 112, 114 of the tithe 120 in FIGS. 1A-F. The cover 628 can protect the ends 112, 114 from being directly heated by a heat source. For example, the cover 628 can comprise a thermal barrier and/or comprise a plurality of layers. Each layer of the cover 628 can comprise the same material or different materials. The ends 112 and 114 can be configured as a weak link and/or failure point to release the working fluid in examples where overheating and/or over pressurization of the fluid conduit 110 may occur. The cover 628 can direct working fluid that may be released from the ends 112, 114 in a desired direction, such as, for example, away from an operator (e.g., towards the center of the cookware 100). A release of the working fluid can be precisely controlled. In various other examples, the ends 112, 114 may be disposed on the side of the cookware and/or a handle (not shown) can be disposed over the ends 112, 114.

As illustrated in FIG. 2, the cookware 200 can comprise a contact layer 230 attached to the first side 204 of the base 202. The contact layer 230 can be configured to contact an object to be heated, such as, for example, food. The contact layer 230 can comprise a metal or a metal alloy. The contact layer 230 can comprise a food compatible material, such as, for example, 300 series stainless steel. The contact layer 330 can be a food contact layer.

Figure 4:
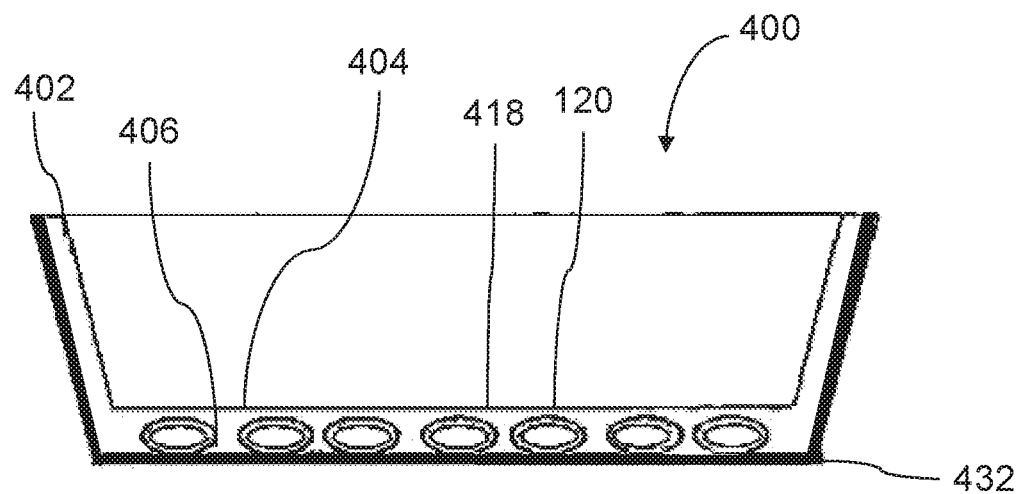
FIG. 4 is a cross-sectional view of a cookware comprising a metallic layer according to an aspect of the present disclosure.

As illustrated in FIG. 4, a cookware 400 can comprise a metallic layer 432 attached to the second side 406 of the base 102. The metallic layer 432 can comprise a metal or metal alloy. The metallic layer 130 can be an inductive layer and can comprise a ferromagnetic metal or a ferromagnetic metal alloy. For example, the inductive layer can comprise 400 series stainless steel.

Figure 11:
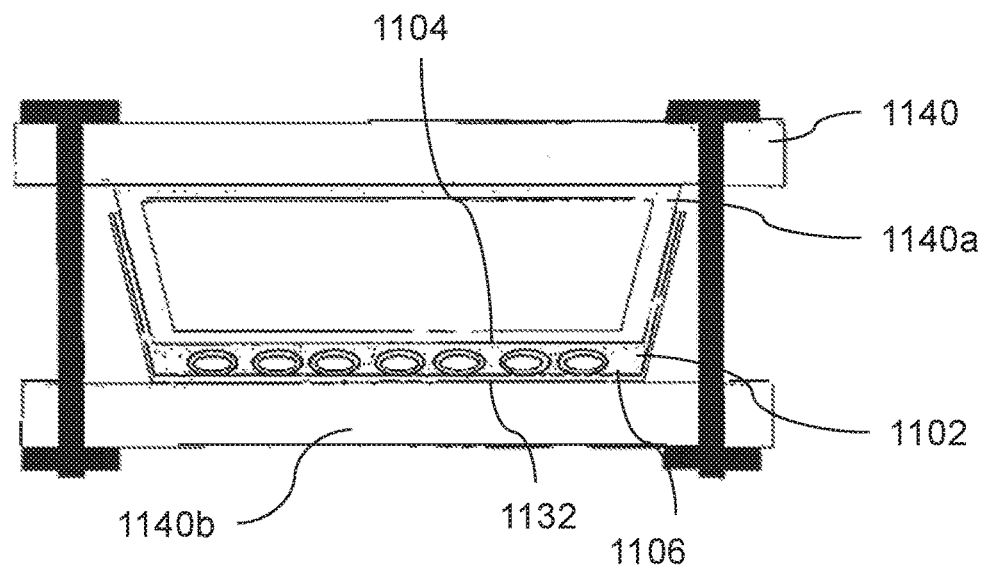
FIG. 11 is a cross-sectional side view of a cookware in a brazing fixture according to an aspect of the present disclosure.

The contact layer 230, and/or the metallic layer 432 can be attached to their respective base 202, 402 by brazing (e.g., vacuum brazing, atmospheric brazing, induction brazing) as further described and illustrated in FIG. 11 herein.

A coating can be deposited over the base 102, the contact layer 230, and/or the metallic layer 432. For example, the coating can be a non-stick coating, such as, for example, a teflon coating, a protective coating, and/or a coating to promote bonding of the elements (e.g., nickel or a nickel alloy plating).

Referring to FIG. 5, the cookware 500 can comprise a fluid conduit 510 in contact with a base 502 of the cookware. For example, a channel 518 can be embedded in a base 502 of the cookware 500 and a metallic layer 532 can be disposed over the channel 518 and attached to the second side 506 of the base 502, thereby forming the fluid conduit 510 intermediate the metallic layer 532 and the channel 518. A cavity 518a of the channel 518 can be at least partially enclosed by the metallic layer 532 and the cavity 518a can define the fluid conduit 510.

The fluid conduit 510 can comprise a charging port 538. The charging port 538 can be a tube inserted through a bore in the base 502 and the charging port 538 can form a sealing relationship with the base 502. For example, the charging port 538 can be brazed to the base 502. The charging port 538 can be used to introduce working fluid to the fluid conduit 510 and the charging port 538 can be sealed by at least one of a crimp 534 of the charging port 538 and a weld 536 of the charging port 538.

Figure 7A:
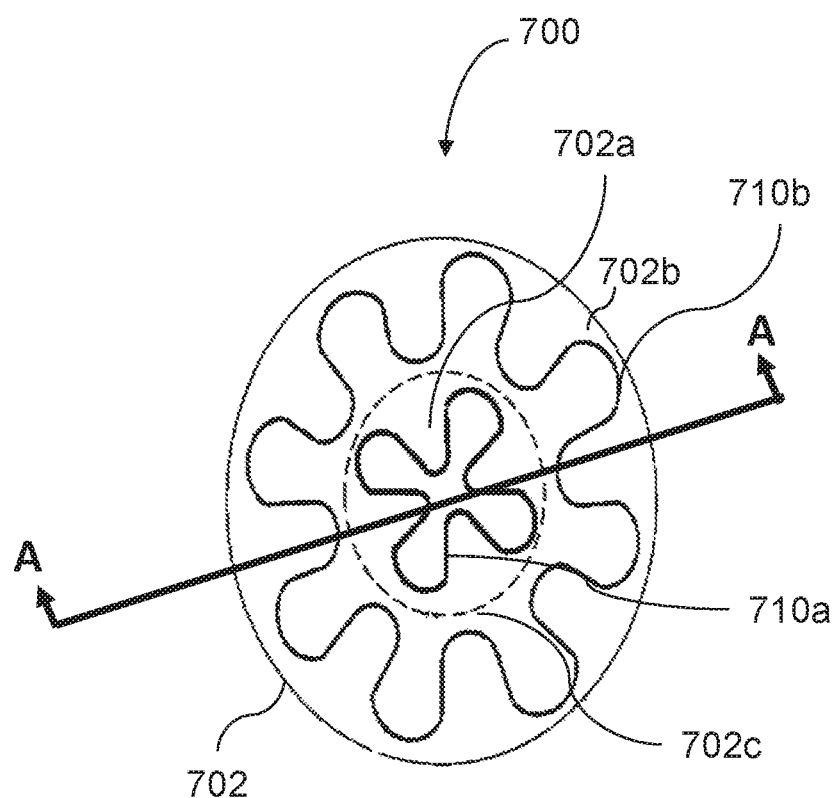
FIG. 7A is a top schematic view of a cookware comprising two fluid conduits according to an aspect of the present disclosure.
Figure 7B:
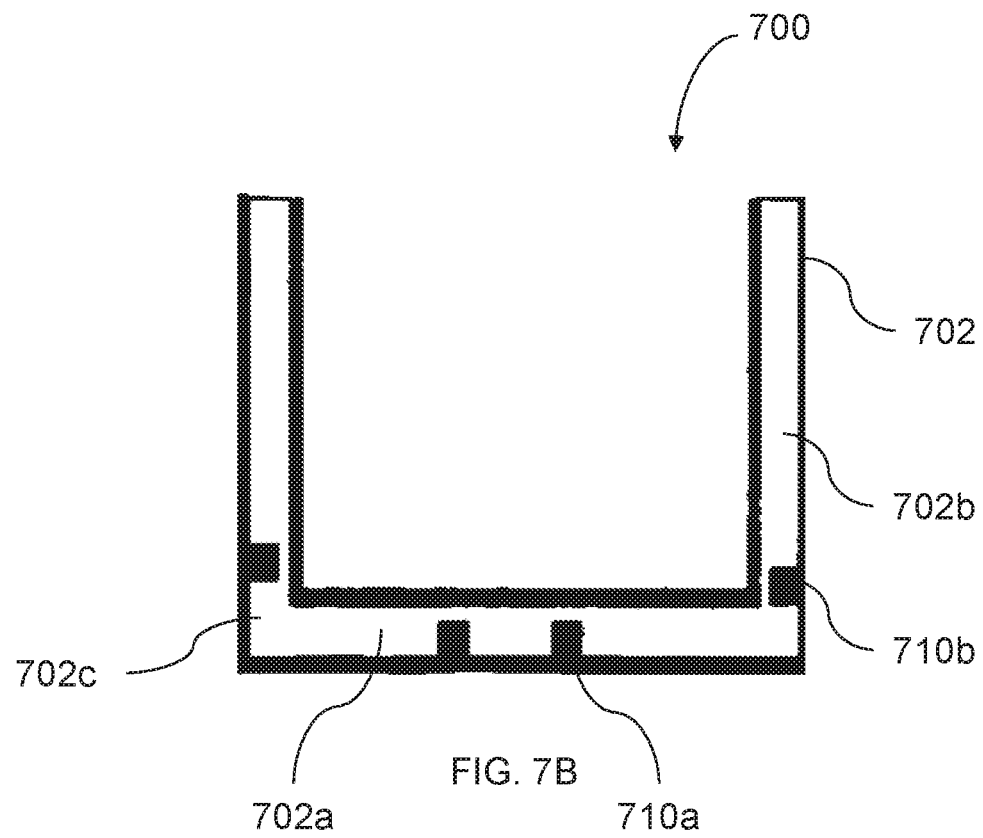
FIG. 7B is a cross-sectional side view of the cookware of FIG. 7A cut along line A-A.

Referring to FIGS. 7A-B, a cookware 700 comprising two fluid conduits 710a, 710b is provided. The base 702 can comprise a first base section 702a, a second base section 702b, and a curved base section 702c, The curved base section 702c can be disposed intermediate the first base section 702a and the second base section 702b. The curved base section 702c can orient the first base section 702a with respect to the second base section 702b. For example, the first base section 702a can be a bottom of the cookware 700, the second base section 702b can be sidewalls of the cookware 700, and the curved base section 702c can be a transition between the first base section 702a and the second base section 702h.

Figure 8:
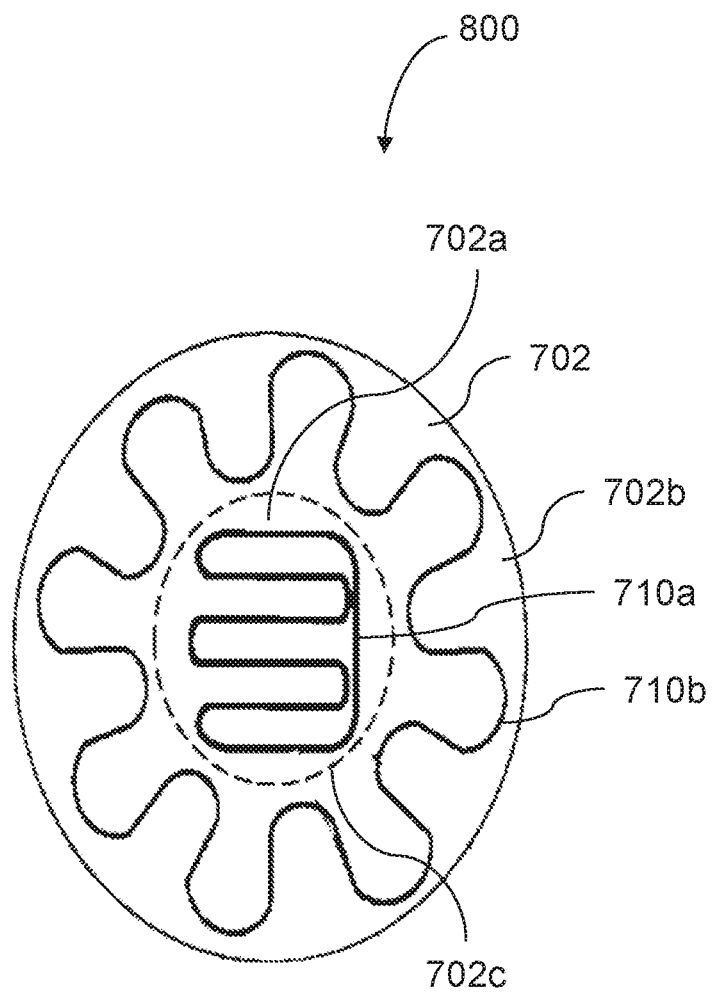
FIG. 8 is a top schematic view of a cookware comprising two fluid conduits in a different configuration according an aspect of the present disclosure.

The fluid conduit 710a can be embedded in the first section 702a of the base 702 and the fluid conduit 710b can be embedded in the second section 702b of the base 702. Each fluid conduit 710a, 710b can be a separate closed fluid system. The fluid conduits 710a, 710b can effectively transfer heat from a portion of the first base section 702a uniformly throughout the remainder of the first base section 702a, the second base section 702b, and the curved base section 702c. FIG. 8 illustrates a cookware 800 comprising a different configuration of the fluid conduits 710a, 710h that can be used to uniformly transfer heat.

The cookware according to the present disclosure can be, for example, a griddle, a pot, a pan, or a commercial-scale cooking surface. For example, the cookware can be a fry pan with curved side walls, a sauté pan with substantially linear side walls, a wok, a tapered sauce pan, a straight sided sauce pan, a brazier, a rondo pot, a sauce pot, a stock pot, a roasting pan, a paella pan, a skillet, a Dutch oven, a cake pan, a bread pan, a sheet pan, a cake pan, a pie pan, a spring form pan, a tart pan, a flat griddle, a grooved griddle, a curved griddle, and a self-heating griddle (e.g., assembly of the griddle with a heat source). The cookware according to the present disclosure can be a cooking vessel. The cookware can also be one or multiple segments of a large commercial-scale cooking surface (e.g., cooktop).

Figure 9:
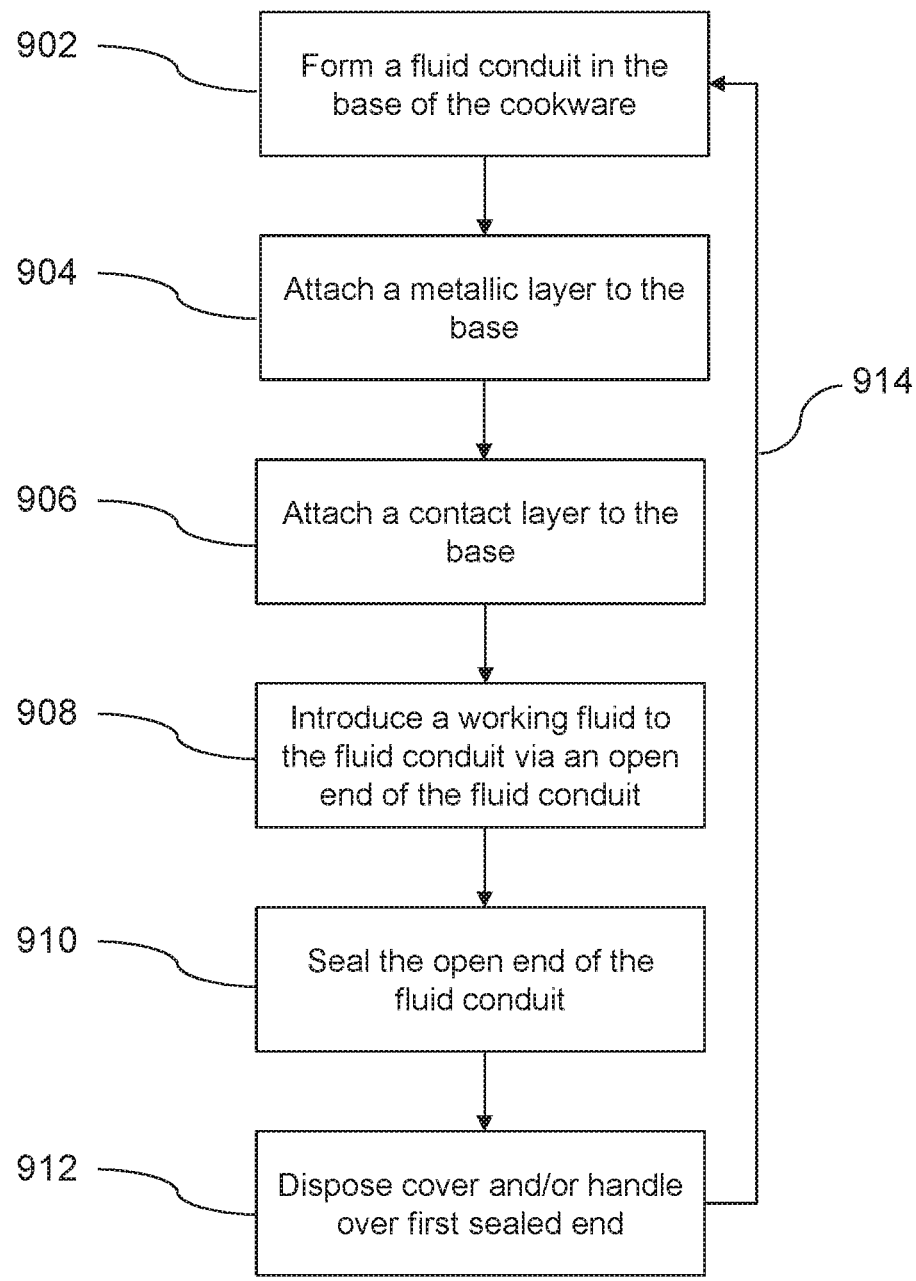
FIG. 9 is a flow chart illustrating a method for manufacture of cookware according to an aspect of the present disclosure.

Referring to FIG. 9, a method for manufacturing a cookware is provided. The method can comprise forming a fluid conduit defining a volume in a base of the cookware, 902. The fluid conduit can comprise an open end or at least two open ends.

For example, a channel can be formed in the base of the cookware. The channel can define a cavity having a first diameter and sidewalls defining an opening having a second diameter that can be less than the first diameter. A tube can be pressed into the channel of the base of the cookware. The fluid cavity can be disposed within the tube and the tube can comprise the open end. The tube can be deformed to a shape substantially similar to a shape of the channel.

In various other examples, a tube can be configured with the fluid conduit and the open end. Then, the base of the cookware can be formed around the tube utilizing at least one of a casting process and a molding process. A temperature of the tube can be controlled during the casting and/or molding process by flowing a fluid (e.g., a gas, oil) through the tube. Controlling the temperature of the tube can control the cooling rate of the cookware after the casting process and/or molding process.

In various examples, the base of the cookware according to the present disclosure can comprise aluminum or an aluminum alloy and a tube within the channel of the cookware can comprise copper or a copper alloy. The tube comprising copper or a copper alloy can be configured with the fluid conduit and the open end. Thereafter, the tube can be placed inside of a mold. Molten aluminum can be injected into the mold to form a base around the tube. The injection of the molten aluminum can be performed in an inert atmosphere (e.g., under nitrogen) or under vacuum to prevent oxide formation during the casting process. Then the mold can be cooled and the cast base can be removed.

In various other examples, a channel can be formed in the base of the cookware. The metallic layer can be deposited over the channel and the metallic layer can be attached to the base to form the fluid conduit.

Forming the channel in the base of the cookware can comprise at least one of machining, forging, etching, molding, cold rolling, hot rolling, pressing, stamping, machining, high pressure fluid forming, and additive manufacturing. The base can comprise a single layer or a plurality of layers. For example, multiple sheets of a metal or metal alloy with at least a portion of the channel embedded within the respective sheet can be stacked together to form a stack comprising the channel. Thereafter, the stack can be bonded together. The base, contact layer, and/or metallic layer can be at least partially coated with nickel prior to assembly of the stack, in various examples, the channel can be machined into a base. The machining process can comprise forming a channel comprising an undercut on either side of the channel. The undercuts can form sidewalls in the channel which can retain a tube pressed into the machined channel.

In various examples, a charging port can be attached to the open end of the fluid conduit. The charging port can be attached by forming a hole into the base (e.g., boring) and inserting the charging port into the hole. A sealing relationship between the charging port and the base can be established by, for example, brazing.

A metallic layer can be attached to the base, 904. The metallic layer can be an inductive layer. In various examples, the metallic layer can be a cover over the first sealed end and/or second sealed end.

A contact layer can be attached to the base, 906. The contact layer can be a food contact layer.

A working fluid can be introduced to the fluid conduit via the open end of the fluid conduit, 908. A liquid phase of the working fluid can occupy less than the volume of the fluid conduit. For example, the fluid conduit can be configured with a range of 20 percent to 80 percent of the liquid phase of the working fluid, such as, for example, 40 percent to 60 percent of the liquid phase of the working fluid. Introducing working fluid via the open end of the fluid conduit can comprise introducing working fluid via the charging port.

In order to achieve the desired range of working fluid in the fluid conduit, the fluid conduit can be filled with the working fluid (e.g., at least 99 percent by volume of the liquid phase of the working fluid in the fluid conduit) via the open end. Then, a range of 20 percent to 80 percent by volume of the work fluid, such as, for example, 40 percent to 60 percent by volume of the working fluid, can be removed from the fluid conduit via the open end by heating the working fluid within the fluid conduit to a temperature of at least a boiling point of the working fluid. In various other examples, the fluid conduit can be filled with the working fluid via the open end until a range of 20 percent to 80 percent by volume of the volume of the fluid conduit, such as, for example, 40 percent to 60 percent by volume of the volume of the fluid conduit, is occupied by the liquid phase of the working fluid. The fluid conduit can be under vacuum while filling the fluid conduit with the working fluid. For example, the fluid conduit can be subjected to a vacuum via the open end to substantially remove any fluid present in the fluid conduit. Then 20 percent to 80 percent by volume of the fluid conduit, such as, for example, 40 percent to 60 percent by volume of the fluid conduit, can be filled with the liquid phase of the working fluid via the open end utilizing the pressure differential created by pulling a vacuum on the fluid conduit.

A pump and/or a fluid reservoir can be configured in fluid communication with the fluid conduit via the open end and the working fluid can be transferred from the pump and/or fluid reservoir into the fluid conduit via the open end to charge the fluid conduit. In various other examples, at least two open ends may be used for filling the fluid conduit with working fluid. For example, a first open end can be used for filling the fluid conduit with the working fluid and a second open end may be used for removing fluid from the fluid conduit (e.g., pulling a vacuum, venting).

The fluid conduit can be sized and configured to form a vapor phase of the working fluid (e.g., vapor segments) and a liquid phase of the working fluid (e.g., liquid segments) interspersed throughout the fluid conduit. The process used to introduce the working fluid to the fluid conduit can facilitate formation of the vapor segments and liquid segments. The vapor segments and liquid segments can be a result of capillary action. For example, an interaction between the surface tension of the working fluid and an adhesive force between the working fluid and walls of the fluid conduit (e.g., tube, channel) can form the vapor segments and liquid segment. Thus, the fluid conduit can be configured as an oscillating heat pipe.

The open end of the fluid conduit can be sealed to define a closed fluid system, 910. For example, the open end of the tube can be crimped and/or the open end of the tube can be welded. In various examples comprising at least two open ends, all opens ends can be crimped and/or welded simultaneously or at different times depending on the process used to introduce the working fluid to the fluid conduit. The pump and/or fluid reservoir is not in communication with the fluid conduit after defining the closed fluid system.

Sealing the open end of the tube creates a first sealed end of the tube. A cover and/or a handle can be disposed over the first sealed end of the tube and in various examples comprising at least two open ends, a second sealed end of the tube, 912.

Steps 902 to 912 can be repeated (in part or whole) to add additional fluid conduits to the cookware as desired, 914. For example, the cookware can comprise at least two fluid conduits or at least three fluid conduits.

Thereafter, the cookware can receive a thermal input from a heat source, such as, for example, a gas fired heat source (e.g., a gas burner), an electric heat source (e.g., a coil type burner, an induction type burner), or other suitable heat source. The cookware can rapidly and/or uniformly change (e.g., increase) the temperature of the heating zone of the base responsive to thermal input from the heat source.

Figure 10:
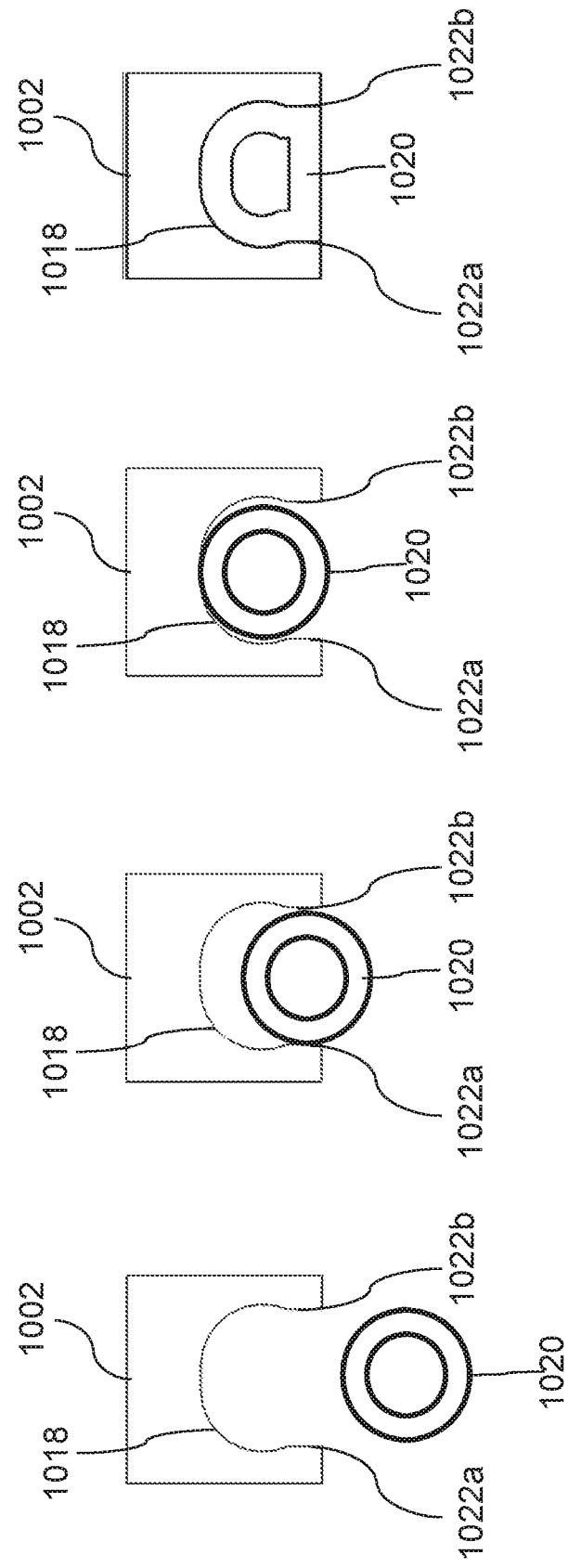
FIG. 10A is a cross-sectional side view of a tube and a channel in a first stage of manufacture according to an aspect of the present disclosure.
FIG. 10B is a cross-sectional side view of the tube and channel of FIG. 10A in a second stage of manufacture according to an aspect of the present disclosure.
FIG. 10C is a cross-sectional side view of the tube and channel of FIG. 10B in a third stage of manufacture according to an aspect of the present disclosure.
FIG. 10D is a cross-sectional side view of the tube and channel of FIG. 10C in a fourth stage of manufacturing according to an aspect of the present disclosure.

Referring to FIGS. 10A-B a tube 1020 can be pressed into a channel 1018 embedded in a base 1002. For example, the tube 1020 can be positioned in substantial alignment with the channel 1018 as illustrated in FIG. 10A. The substantial alignment can facilitate insertion of the tube to the channel 1018. Then, the tube 1020 can be at least partially inserted into the channel 1018 as illustrated in FIG. 10B and fully inserted into the channel 1018 as illustrated in FIG. 10C. The tube 1020 can be deformed to a shape substantially similar to a shape of the channel 1018 as illustrated in FIG. 10D (e.g., tube 120 can be nested within channel 1018). For example, the tube 1020 can be deformed from a substantially cylindrical shape to a mushroom shape. Sidewalls 1022a-b can retain the tube 1020 within the channel 1018. In various examples, the tube 1020 can be retained within the channel 1018 without the use of additional adhering procedures, such as, for example, brazing.

Referring to FIG. 11, a brazing fixture 1140 can be used to hold a respective layer against the base 1102 of a cookware 1100 during a brazing process. For example, a metallic layer 1132 can be brazed to a second side 1106 of the base 1102 of the cookware 1100 utilizing the brazing fixture 1140. A brazing preform and/or a brazing paste can be applied to the second side 1106 of the base 102 upon which the metallic layer 1132 will be attached. In examples comprising a charging tube, brazing paste can be applied around the tube where the tube contacts the base 1102 and the channel 1118. As illustrated, the metallic layer 1132 can be contacted by a second portion 1140b of the brazing fixture and the first side 1104 of the base 1102 can be contacted by a first portion 1140a of the brazing fixture 1140. The first and second portions 1140a-b of the brazing fixture 1140 can be moved closer to one another causing the base 1102 and metallic layer 1132 to contact each other and/or be held in place. Thereafter, the brazing fixture 1140 and cookware 1100 can be subjected to a brazing process. For example, the brazing fixture 1140 can apply a force of at least 100 pounds per square inch (psi), such as, for example, at least 2000 psi to the surfaces which will be bonded. Thereafter, the cookware 1110 can be heated to bond the metallic layer 1132 to the base 1102. In various examples, a contact layer (not shown) can also be brazed to the base 1102.

After the brazing process, working fluid can be introduced into the fluid conduit 1110 of the cookware 1100 and the end of the fluid conduit can be sealed (e.g., tube and/or charging port can be crimped and/or welded).

Figure 12:
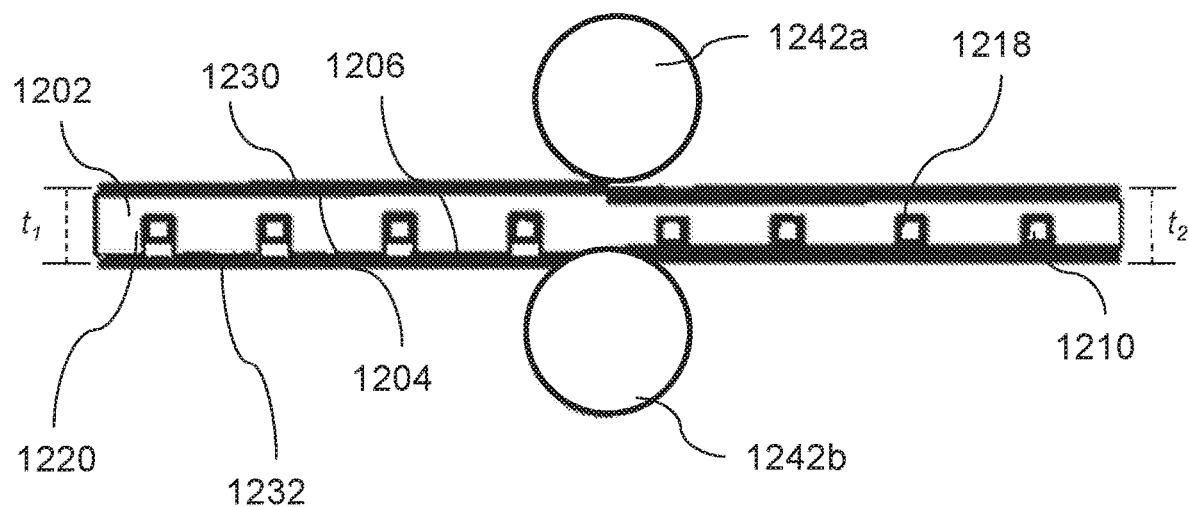
FIG. 12 is a cross-sectional side view of a cookware undergoing a roll bonding procedure according to an aspect of the present disclosure.

Referring to FIG. 12, a cookware 1200 can be manufactured by roll bonding. As illustrated, the cookware 1200 can comprise a base 1202, a contact layer 1230, and a metallic layer 1232. The base 1202 can comprise a tube 1220 embedded in a channel 1218 of the base 1202. The base 1202, a contact layer 1230, and a metallic layer 1232 can be stacked (hereinafter collectively referred to as "stack") and passed through rollers 1242a-b. The rollers 1242a-b can apply sufficient pressure to bond the contact layer 1230 to a first side 1204 of the base 1202 and bond the metallic layer 1232 to a second side 1206 of the base 1202. Upon passing the stack through the rollers, the stack can be deformed. For example, a first thickness, $t_1$, of the stack can be reduced to a second thickness, $t_2$.

The cookware according to the present disclosure can comprise an effective thermal conductivity of at least 500 W/m·K (Watts per meter-Kelvin such as, for example, at least 1,000 W/m·K, at least 1,500 W/m·K, or at least 2,000 W/m·K.

Examples

An inventive griddle was prepared according to the present disclosure. The inventive griddle had an aluminum base comprising a machined channel. A copper tube with an outer diameter of 0.125″ was pressed into the machined channel until the copper tube was nearly flush with the surface of the second side of the base. The copper tube was evacuated and 60% of the volume was charged with degassed water via two open ends and each open end was sealed with five crimps on the copper tube and a weld on the copper tube. The inventive griddle was 13 inches wide by 20 inches long.

A first comparative griddle comprising an anodized aluminum base and was 13 inches wide by 20 inches long was obtained.

A second comparative griddle comprising an aluminum layer, a copper layer, and a stainless steel layer was obtained. The second comparative griddle was 13 inches wide by 20 inches long.

Figure 13:
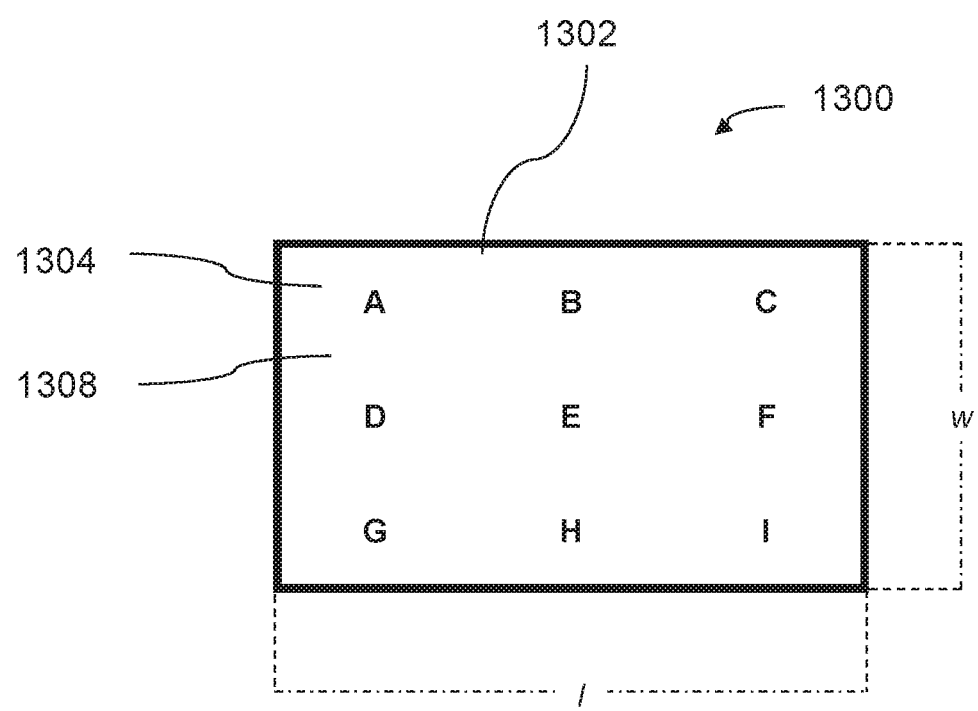
FIG. 13 is a schematic diagram illustrating locations of thermocouples on an inventive griddle according to an aspect of the present disclosure, a first comparative griddle, and a second comparative griddle.

Referring to FIG. 13, each griddle 1300 was configured with 9 thermocouples in a 3 by 3 array contacting 9 locations shown as locations A-F on the first side 1304 of the base 1302 of each griddle 1300. The 9 locations A-F were located within the heating zone 1308 of each griddle 1300 with location E being the center of each griddle 1300. Locations A-C were evenly spaced across the length, l, of each griddle 1300 in a line across a first side length portion of each griddle 1300 six inches apart from each other; locations D-F were evenly spaced across the length, l, of each griddle 1300 in a line across a middle length portion of each griddle 1300 six inches apparat from each other; and locations G-I were evenly spaced across the length, l, of each griddle 1300 in a line across a second side length portion of each griddle 1300 six inches apart from each other. Locations A, D, and G, were evenly spaced across the width, l, of each griddle 1300 in a line across a first side width portion of each griddle 1300 five inches apart from each other; locations B, E, and H, were evenly spaced across a width, w, of each griddle 1300 in a line across a middle width portion of each griddle 1300 five inches apart from each other; and locations C, F, and I, were evenly spaced across a width, w, of each griddle 1300 in a line across a second side width portion of each griddle 1300 five inches apart from each other.

A gas burner was positioned under the inventive griddle and the first comparative griddle on the second side of the base 1302 opposite the first side 1304 of the base 1302 of each griddle 1300. The gas burner was positioned proximal to location D on each respective griddle 1300. The gas burner was turned on to 330 watts of heat output for ten minutes at which time steady state temperature was obtained. After steady state was obtained at 330 Watts of heat output, the temperature at locations A-F were measured for the first comparative griddle as shown in Table 1 in degrees Celsius and the inventive griddle as shown in Table 2 in degrees Celsius.

TABLE 1

Measured temperatures of the first comparative griddle at locations A-F with the burner at 330 Watts of heat output

| | | |
|---|---|---|
| A = 130° C. | B = 96° C. | C = 63° C. |
| D = 168° C. | E = 105° C. | F = 62° C. |
| G = 129° C. | H = 98° C. | I = 61° C. |

TABLE 2

Measured temperature of the inventive griddle at locations A-F with the burner at 330 Watts of heat output

| | | |
|---|---|---|
| A = 130° C. | B = 121° C. | C = 117° C. |
| D = 136° C. | E = 137° C. | F = 133° C. |
| G = 123° C. | H = 109° C. | I = 101° C. |

As shown in Tables 1-2, the inventive griddle was more uniformly heated than the first comparative griddle. The largest measured non-uniformity in temperature across the first comparative griddle was between locations D and J which was 107 degrees Celsius. The largest measured non-uniformity in temperature across the inventive griddle was between locations D and J which was 35 degrees Celsius, an improvement of 72 degrees Celsius compared to the first comparative griddle.

A gas burner was positioned under the inventive griddle and the second comparative griddle on the second side of the base 1302 opposite the first side 1304 of the base 1302 of each griddle 1300. The gas burner was positioned proximal to location D. The gas burner was turned on to 500 Watts of heat output for a 10 minutes at which time steady state temperature was obtained. After steady state was obtained at 500 Watts of heat output, the temperature at locations A-F were measured for the second comparative griddle as shown in Table 3 in degrees Celsius and the inventive griddle as shown in Table 4 in degrees Celsius.

TABLE 3

Measured temperatures of the second comparative griddle at locations A-F with the burner at 500 Watts of heat output

| | | |
|---|---|---|
| A = 199° C. | B = 131° C. | C = 85° C. |
| D = 216° C. | E = 141° C. | F = 87° C. |
| G = 201° C. | H = 130° C. | I = 86° C. |

TABLE 4

Measured temperatures of the inventive griddle at locations A-F with the burner at 500 Watts of heat output

| | | |
|---|---|---|
| A = 205° C. | B = 187° C. | C = 173° C. |
| D = 211° C. | E = 205° C. | F = 195° C. |
| G = 206° C. | H = 195° C. | I = 174° C. |

As shown in Tables 3-4, the inventive griddle was more uniformly heated than the second comparative griddle. The largest measured non-uniformity in temperature across the second comparative griddle was between locations D and C which was 131 degrees Celsius. The largest measured non-uniformity in temperature across the inventive griddle was between locations D and C which was 38 degrees Celsius, an improvement of 93 degrees Celsius compared to the second comparative griddle.

In yet another example, a gas burner was positioned under the inventive griddle and the second comparative griddle on the second side of the base 1302 opposite the first side 1304 of the base 1302 of each griddle 1300. The gas burner was positioned proximal to location D. The gas burner was turned on to 150 Watts for 10 minutes at which time steady state temperature was obtained. After steady state was obtained at 150 Watts of heat output, a thermal image of the second comparative griddle was captured as illustrated in FIG. 14A and a thermal image of the inventive griddle was captured as illustrated in FIG. 14B. Then, the gas burner was turned on to 230 Watts for 10 minutes at which time steady state temperature was obtained. After steady state was obtained at 230 Watts of heat output, a thermal image of the second comparative griddle was captured as illustrated in FIG. 14C and a thermal image of the inventive griddle was captured as illustrated in FIG. 14D. The thermal camera was a SR7200 thermal camera available from FUR Wilsonville, Oregon. The thermal camera has a temperature range of 60 degrees Celsius to 130 degrees Celsius. Thus, temperature gradations are only shown for temperatures in the temperature range of 60 degrees Celsius to 130 degrees Celsius. Temperatures below 60 degrees Celsius appear as a similar color and temperatures above 130 degrees Celsius would appear as a similar color, A K-type thermocouple available from Omega Engineering was used to verify the temperature readings from the thermal camera on the right side of each griddle. The thermocouple was attached along a center line of the griddle and 12" from the center of the gas burner using Kapton tape. For example, in FIG. 14A, the thermocouple confirmed the measurement of 28 degrees Celsius by the thermal camera; in FIG. 14B, the thermocouple confirmed the measurement of 68 degrees Celsius by the thermal camera; in FIG. 14C, the thermocouple confirmed the measurement of 35 degrees Celsius by the thermal camera; and in FIG. 14D, the thermocouple confirmed the measurement of 119 degrees Celsius by the thermal camera.

In FIG. 14A, the highest measured temperature by the thermal camera was 90 degrees Celsius and the lowest measured temperature was 28 degrees Celsius. In FIG. 14B, the highest measured temperature by the thermal camera was 90 degrees Celsius and the lowest measured temperature was 68 degrees Celsius. In FIG. 14C, the highest measured temperature by the thermal camera was 130 degrees Celsius and the lowest measured temperature was 35 degrees Celsius. In FIG. 14D, the highest measured temperature by the thermal camera was 130 degrees Celsius and the lowest measured temperature was 119 degrees Celsius. As shown in 14A-D, the inventive griddle was more uniformly heated than the second comparative griddle.

It is believed that other cookware made according to the present disclosure would also exhibit an improvement in uniformity of heating.

One skilled in the art will recognize that the herein described cookware, methods, operations/actions, and objects, and the discussion accompanying them, are used as examples for the sake of conceptual clarity and that various configuration modifications are contemplated. Consequently, as used herein, the specific examples set forth and the accompanying discussion are intended to be representative of their more general classes. In general, use of any specific exemplar is intended to be representative of its class, and the non-inclusion of specific components, devices, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the various aspects of the present disclosure should be understood to be at least as broad as they are claimed, and not as more narrowly defined by particular illustrative aspects provided herein.

What is claimed is:

1. A method for manufacturing a cookware, the method comprising:
    forming a fluid conduit defining a volume in a base of the cookware, the base comprising a heating zone configured for thermal communication with the fluid conduit, wherein forming the fluid conduit in the base of the cookware comprises forming a channel in the base of the cookware, the channel defining a cavity having a first diameter and sidewalls defining an opening having a second diameter that is less than the first diameter,
        pressing a tube into the channel of the base of the cookware, wherein the fluid conduit is disposed within the tube, and
        deforming the tube to a shape substantially similar to a shape of the channel,
    introducing a working fluid to the fluid conduit via an open end of the tube, wherein a liquid phase of the working fluid occupies less than the volume of the fluid conduit, wherein the fluid conduit is sized and configured to form vapor segments and liquid segments interspersed throughout the fluid conduit from the working fluid;
    sealing the open end of the fluid conduit to define a closed fluid system, wherein sealing the open end of the tube creates a first sealed end of the tube; and
    fixing a cover, a handle, or a combination thereof over the first sealed end of the tube and a second sealed end of the tube.

2. The method of claim 1, wherein a sectional view of the channel defines a mushroom shape.

3. The method of claim 1, wherein sealing the open end of the tube comprises at least one of crimping the open end of the tube and welding the open end of the tube.

4. The method of claim 1, further comprising fixing a cover over the first sealed end of the tube and the second sealed end of the tube.

5. The method of claim 1, further comprising fixing a handle over the first sealed end of the tube and the second sealed end of the tube.

6. The method of claim 1, wherein introducing the working fluid to the fluid conduit via the open end of the fluid conduit comprises filling the fluid conduit with fluid and removing 20 percent to 80 percent by volume of the working fluid from the fluid conduit by heating the fluid within the fluid conduit to a temperature of at least a boiling point of the fluid.

7. The method of claim 6, wherein the fluid conduit is under vacuum while filling the fluid conduit with the working fluid.

8. The method of claim 1, wherein introducing the working fluid to the fluid conduit via the open end of the fluid conduit comprises filling the fluid conduit with the working fluid until 20 percent to 80 percent by volume of the volume of the fluid conduit is occupied by the liquid phase of the working fluid.

9. The method of claim 1, wherein the fluid conduit comprises at least two open ends.

10. A method for manufacturing a cookware, the method comprising:
    forming a first fluid conduit defining a first volume in a first base section of a base of the cookware, the base comprising a heating zone configured for thermal communication with the first fluid conduit;
    introducing a first working fluid to the first fluid conduit via an open end of the first fluid conduit, wherein a liquid phase of the first working fluid occupies less than a volume of the first fluid conduit, wherein the first fluid conduit is sized and configured to form vapor segments and liquid segments interspersed throughout the first fluid conduit from the first working fluid;
    sealing the open end of the first fluid conduit to define a first closed fluid system;
    forming a second fluid conduit in a second base section of the base of the cookware, the second fluid conduit defining a second volume;
    introducing a second working fluid to the second fluid conduit via an open end of the second fluid conduit, wherein a liquid phase of the second working fluid occupies less than a volume of the second fluid conduit, wherein the second fluid conduit is sized and configured to form vapor segments and liquid segments interspersed throughout the second fluid conduit from the second working fluid; and
    sealing the open end of the second fluid conduit to define a second closed fluid system.

11. A cookware comprising:
    a base comprising a first side, a second side, and a heating zone on the first side, the base comprising a metal or a metal alloy;
    a first fluid conduit defining a volume embedded in a first base section of the base, the heating zone configured for thermal communication with the first fluid conduit, the first fluid conduit being a closed fluid system, the first fluid conduit comprising:
        a first sealed end;

a first curved section; and a first working fluid, wherein a liquid phase of the first working fluid occupies less than the volume of the first fluid conduit, wherein the first fluid conduit is sized and configured to form vapor segments and liquid segments interspersed throughout the first fluid conduit from the first working fluid; and a second fluid conduit defining a second volume embedded in a second base section of the base, the heating zone configured for thermal communication with the second fluid conduit, the second fluid conduit being a closed fluid system, the second fluid conduit comprising:

a second sealed end;

a second curved section; and a second working fluid, wherein a liquid phase of the second working fluid occupies less than the volume of the second fluid conduit, wherein the second fluid conduit is sized and configured to form vapor segments and liquid segments interspersed throughout the second fluid conduit from the second working fluid.

12. The cookware of claim 11, wherein the cookware comprises:

a channel embedded in the base of the cookware, the channel defining a cavity having a first diameter and sidewalls defining an opening having a second diameter that is less than the first diameter; and a tube disposed within the channel and retained by the sidewalls, the tube comprising a shape substantially similar to a shape of the channel, wherein the tube comprises the first sealed end, and the tube defines a fluid cavity disposed within the tube.

13. The cookware of claim 12, wherein a sectional view of the channel defines a mushroom shape and wherein the cavity comprises a substantially oval shape.

14. The cookware of claim 12, wherein the channel is embedded into the first side of the base and does not extend to the second side of the base, the channel is embedded into the second side of the base and does not extend to the first side of the base, or the channel is embedded within the base and does not extend to the first side or the second side of the base.

15. The cookware of claim 11, wherein the cookware comprises:

a channel embedded in the base; and a metallic layer disposed over the channel and attached to the second side of the base, the metallic layer and the channel forming the first fluid conduit.

16. The cookware of claim 11, wherein the base comprises a curved base section disposed intermediate the first base section and the second base section.

* * * * *